US012748362B2

(12) United States Patent
Yamano et al.

(10) Patent No.: US 12,748,362 B2
(45) Date of Patent: Sep. 29, 2026

(54) OPTICAL SCANNING DEVICE AND IMAGE FORMING APPARATUS

(71) Applicant: CANON KABUSHIKI KAISHA, Tokyo (JP)

(72) Inventors: Hiroyuki Yamano, Kanagawa (JP); Tetsuya Nishiguchi, Kanagawa (JP); Hiroyuki Fukuhara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 18/608,835

(22) Filed: Mar. 18, 2024

(65) Prior Publication Data

US 2024/0337965 A1 Oct. 10, 2024

(30) Foreign Application Priority Data

Apr. 7, 2023 (JP) ................................ 2023-062557
Jun. 23, 2023 (JP) ................................ 2023-103509

(51) Int. Cl.

*G03G 15/04* (2006.01)
*G02B 26/10* (2006.01)
*G02B 26/12* (2006.01)
*G03G 15/043* (2006.01)

(52) U.S. Cl.

CPC ....... *G03G 15/0435* (2013.01); *G02B 26/105* (2013.01); *G02B 26/121* (2013.01)

(58) Field of Classification Search

CPC .................................................. G03G 15/0435
See application file for complete search history.

(56) References Cited

U.S. PATENT DOCUMENTS

| | | | | |
|---|---|---|---|---|
| 9,523,851 | B2 | 12/2016 | Nakamura et al. | G03G 15/00 |
| 9,581,929 | B2 | 2/2017 | Nagatoshi et al. | G03G 15/043 |
| 9,854,120 | B2 | 12/2017 | Tanaka et al. | G06K 15/12 |
| 9,864,934 | B2 | 1/2018 | Kobayashi et al. | G06K 15/12 |
| 10,078,288 | B2 | 9/2018 | Fukuhara | G03G 15/043 |
| 10,274,858 | B2 | 4/2019 | Fukuhara | G03G 15/00 |
| 10,698,335 | B2 | 6/2020 | Nishiguchi et al. | G03G 15/04 |
| 2019/0265608 | A1 * | 8/2019 | Nishiguchi | G03G 15/04072 |

FOREIGN PATENT DOCUMENTS

| | | |
|---|---|---|
| JP | H01-205119 | 8/1989 |
| JP | H04-253011 | 9/1992 |
| JP | 2005-181501 | 7/2005 |
| JP | 2005-215494 | 8/2005 |

* cited by examiner

*Primary Examiner* — Edmond C Lau
(74) *Attorney, Agent, or Firm* — Venable LLP

(57) ABSTRACT

An optical scanning device includes a deflector, a lens, a casing including a bottom surface on which the deflector and the lens are mounted and a side wall on which a light source is mounted; and a fixing member to position the lens to the casing and to fix an end portion of the lens in a longitudinal direction. In a state in which the lens is fixed to the casing, the fixing member includes a first portion including an engaged portion engaged with a projection projecting from the side wall and extending toward the bottom surface, a second portion including a first surface contacting an inner contacting surface of the casing and a second surface contacting an emergent surface of the lens and extending toward the bottom surface, and a third portion including a third surface contacting an upper surface of the lens and extending toward the bottom surface.

5 Claims, 22 Drawing Sheets

OPTICAL SCANNING DEVICE AND IMAGE FORMING APPARATUS

FIELD OF THE INVENTION AND RELATED ART

The present invention relates to an optical scanning device and an image forming apparatus, for example, an optical scanning device used in an electrophotographic image forming apparatus such as a copy machine and a printer, and an image forming apparatus provided with this optical scanning device.

The conventional optical scanning device used in the image forming apparatus such as a laser printer which deflects and scans a laser beam emitted from a light source according to an image signal by a reflecting surface of a deflector. The deflected and scanned laser beam forms an image on a photosensitive drum by a scanning lens such as an fθ lens to form an electrostatic latent image. Next, the electrostatic latent image on the photosensitive drum is developed into a toner image by a process cartridge such as a developing device, and the toner image is transferred to a recording material such as a recording paper and sent to a fixing device to heat and fix toner on the recording material, thereby printing is performed. A configuration of such an optical scanning device is disclosed, for example, in Japanese Patent Application Laid-Open No. 2005-181501. The scanning lens used in the optical scanning device is pressed in an optical axis direction of the scanning lens by a separate metal plate spring and fixed to an optical box, which is a casing.

However, in the conventional configuration in which the scanning lens is fixed by the separate metal plate spring, it requires a process of bending the plate spring in multiple directions, which makes a shape more complex, resulting in more processing workloads and higher costs. In addition, if each component is deformed due to thermal expansion caused by temperature changes, a distance between the optical box and the scanning lens fluctuates. In addition, pressing force of the plate spring may change in a contacting portion between the lens made of resin and the plate spring made of metal. Specifically, in a case in which the pressing force gets weaker, there is a possibility that a position of the scanning lens shifts when impact is applied. On the other hand, in a case in which the pressing force gets stronger, there is a possibility that the scanning lens is deformed, and optical performance thereof is degraded.

SUMMARY OF THE INVENTION

An object of the present invention is to provide an optical scanning device with high accuracy and high reliability as well as to perform positioning of a lens with low cost and high accuracy.

According to an aspect of the present invention, there is provided an optical scanning device comprising: a light source; a deflector configured to deflect and scan a light beam emitted from the light source; an optical element configured to guide the light beam scanned by the deflector to a scanned member; a casing including a bottom surface on which the deflector and the optical element are mounted, and a side wall which stands from the bottom surface and on which the light source is mounted; and a fixing member configured to position the optical element to the casing and to fix an end portion of the optical element in a longitudinal direction of the optical element, wherein the casing, the optical element and the fixing member are made of resin, wherein the optical element includes an incident surface permitting incidence of the light beam deflected and scanned by the deflector, an emergent surface permitting emission of the light beam incident from the incident surface, a first crossing surface contacting the bottom surface in a state in which the optical element is fixed by the fixing member and crossing the incident surface and the emergent surface, and a second crossing surface crossing the incident surface and the emergent surface and opposite to the first crossing surface, wherein in a state in which the optical element is fixed to the casing by the fixing member, the casing includes a first contacting surface contacting the incident surface in the end portion of the optical element in the longitudinal direction, a side surface of an outside of the casing in the side wall, and a second contacting surface of an inside of the casing in the side wall, wherein the side surface includes a projecting portion projecting toward the outside of the casing, and wherein in a state in which the optical element is fixed to the casing, the fixing member includes a first portion including an engaged portion engaged with the projecting portion and extending toward a direction of the bottom surface, a second portion including a first surface contacting the second contacting surface and a second surface contacting the emergent surface and extending toward the bottom surface, and a third portion including a third surface contacting the second crossing surface and extending toward the bottom surface.

And another aspect of the present invention there is provided an optical scanning device comprising: a light source; a deflector configured to deflect and scan a light beam emitted from the light source; an optical element configured to transmit or reflect the light beam; a casing holding the light source, the deflector and the optical element; and a fixing member configured to press the optical element to the casing, wherein the casing includes a plurality of positioning portions for positioning the optical element in a main scanning direction and an optical axis direction of the optical element, wherein the optical element is provided with a pressed surface pressed by the fixing member, and wherein a normal direction is different from the main scanning direction and the optical axis direction, and the optical element is positioned in the main scanning direction and the optical axis direction to the casing when the optical element is pressed by the fixing member.

Further features of the present invention will become apparent from the following description of exemplary embodiments with reference to the attached drawings.

DESCRIPTION OF THE EMBODIMENTS

Figure 1:
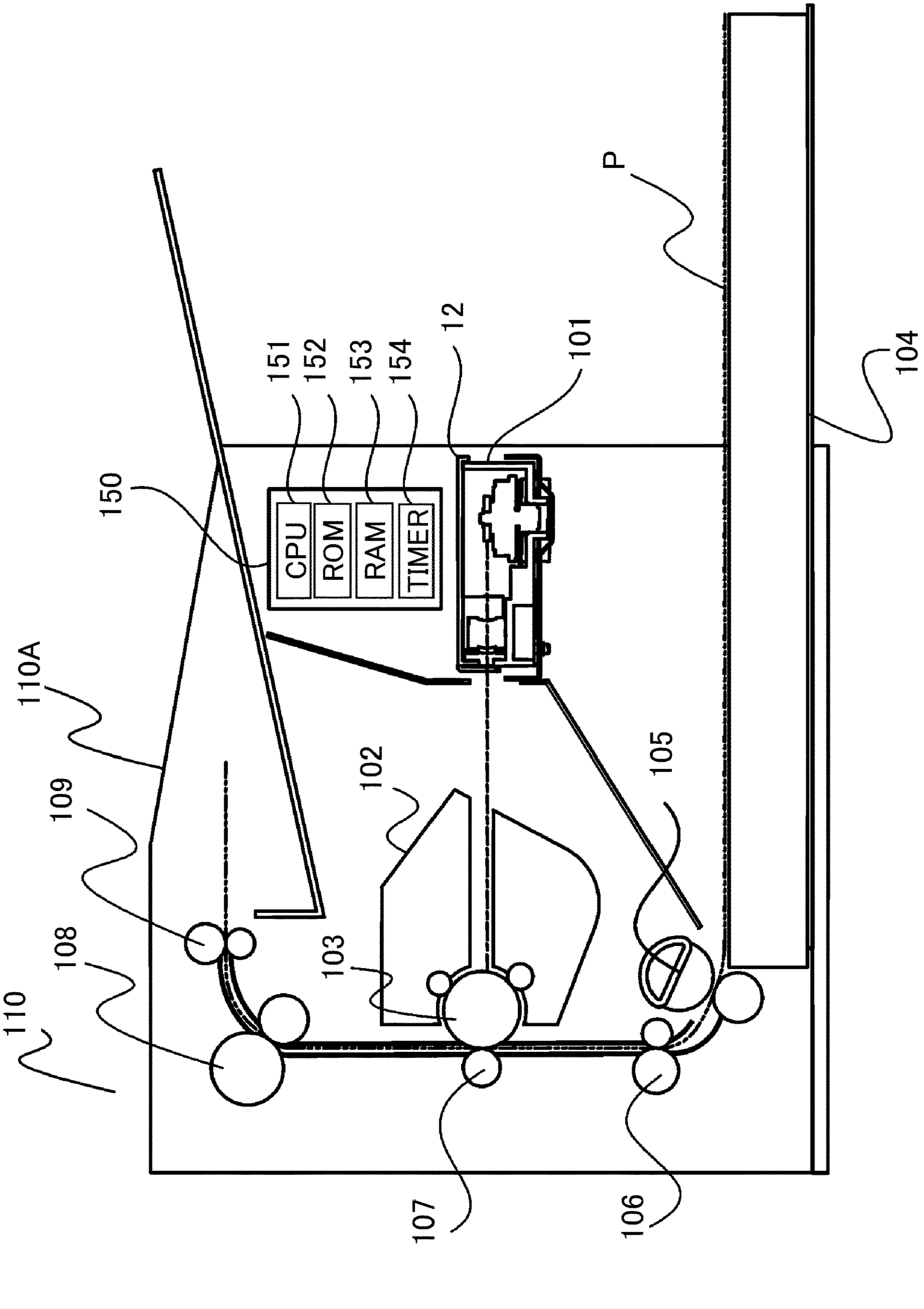
FIG. 1 is a cross-sectional view of an image forming apparatus provided with an optical scanning device of an Embodiment 1 and an Embodiment 2.

Hereinafter, with reference to the drawings, modes for implementing the present invention will be described in detail based on Embodiments. However, since dimensions, materials, shapes, relative positions, etc. of components described in the Embodiments may be changed as necessary depending on a configuration and various conditions of a device to which the present invention is applied, it is not intended to limit the scope of the present invention thereto, unless otherwise specified. Incidentally, with respect to configurations of the later Embodiments, the same reference numeral as in the previous Embodiment shall be applied to the same configuration as in the previous Embodiment, and the description of the previous Embodiment shall be applied.

Embodiment 1

[Image Forming Apparatus]

FIG. 1 is a cross-sectional view of an image forming apparatus 110 provided with an optical scanning device 101 of an Embodiment 1.

The image forming apparatus 110 is provided with the optical scanning device 101 as an exposure means and an image forming portion as an image forming means. The optical scanning device 101 scans a photosensitive drum 103, which is a scanned member, with a light beam (e.g., laser beam), and the image forming portion (e.g., process cartridge described below) performs an image formation on a recording material P, such as a recording paper, based on an image formed on the photosensitive drum 103. Here, a printer is illustrated as an example of the image forming apparatus 110.

The image forming apparatus 110 (printer) emits a laser light beam by the optical scanning device 101 based on obtained image information, and irradiates the photosensitive drum 103, which is built into a process cartridge 102, with the laser light beam. By this, a latent image is formed on the photosensitive drum 103, and the latent image is developed into a toner image by the process cartridge 102 using toner as a developer. Incidentally, the process cartridge 102 is integrally provided with the photosensitive drum 103, charging means (e.g., charging roller), developing means (e.g., developing roller), etc., as process means acting on the photosensitive drum 103.

Meanwhile, the recording material P stacked on a stacking plate 104, which stacks the recording material P, is fed while being separated one by one by a feeding roller 105, and then conveyed further downstream side by an intermediate roller 106. Onto the conveyed recording material P, the toner image formed on the photosensitive drum 103 is transferred by a transfer roller 107. The recording material P, on which the non-fixed toner image is formed, is conveyed further downstream side, and the toner image is fixed to the recording material P by a fixing unit 108, which includes a heating member inside. The recording material P is then discharged outside an apparatus main assembly 110A by a discharging roller 109. In FIG. 1, a path along which the recording material P is conveyed is illustrated as a chain line.

The image forming apparatus 110 is provided with a control portion 150. The control portion 150 includes a CPU 151 (central processing unit), a ROM 152 (read only memory), a RAM 153 (random-access memory), and a timer 154. The CPU 151 includes an analog-to-digital conversion port. The control portion 150 controls the image forming apparatus 110 by executing a program stored in the ROM 152 in advance by the CPU 151 while using the RAM 153 as a temporary work area. The control portion 150 executes various controls of timings while using the timer 154 upon executing the control of the image forming apparatus 110. Incidentally, the control portion 150 may be provided with an ASIC (application specific integrated circuit) or a MPU (micro processing unit). A number of the CPU 151, the timer 154, the ROM 152 and the RAM 153 is not limited to one, but may be two or more. In addition, other storage media such as a hard disk, an optical disk, etc., may be used as a storage media. Incidentally, an image forming apparatus to which the present invention can be applied is not limited to the image forming apparatus 110 shown in FIG. 1.

Incidentally, in the present Embodiment 1, a charging and developing means as a process means acting on the photosensitive drum 103 are configured to be provided integrally with the photosensitive drum 103 in the process cartridge 102. However, each process means may be configured separately from the photosensitive drum 103.

[Optical Scanning Device]

Figure 2:
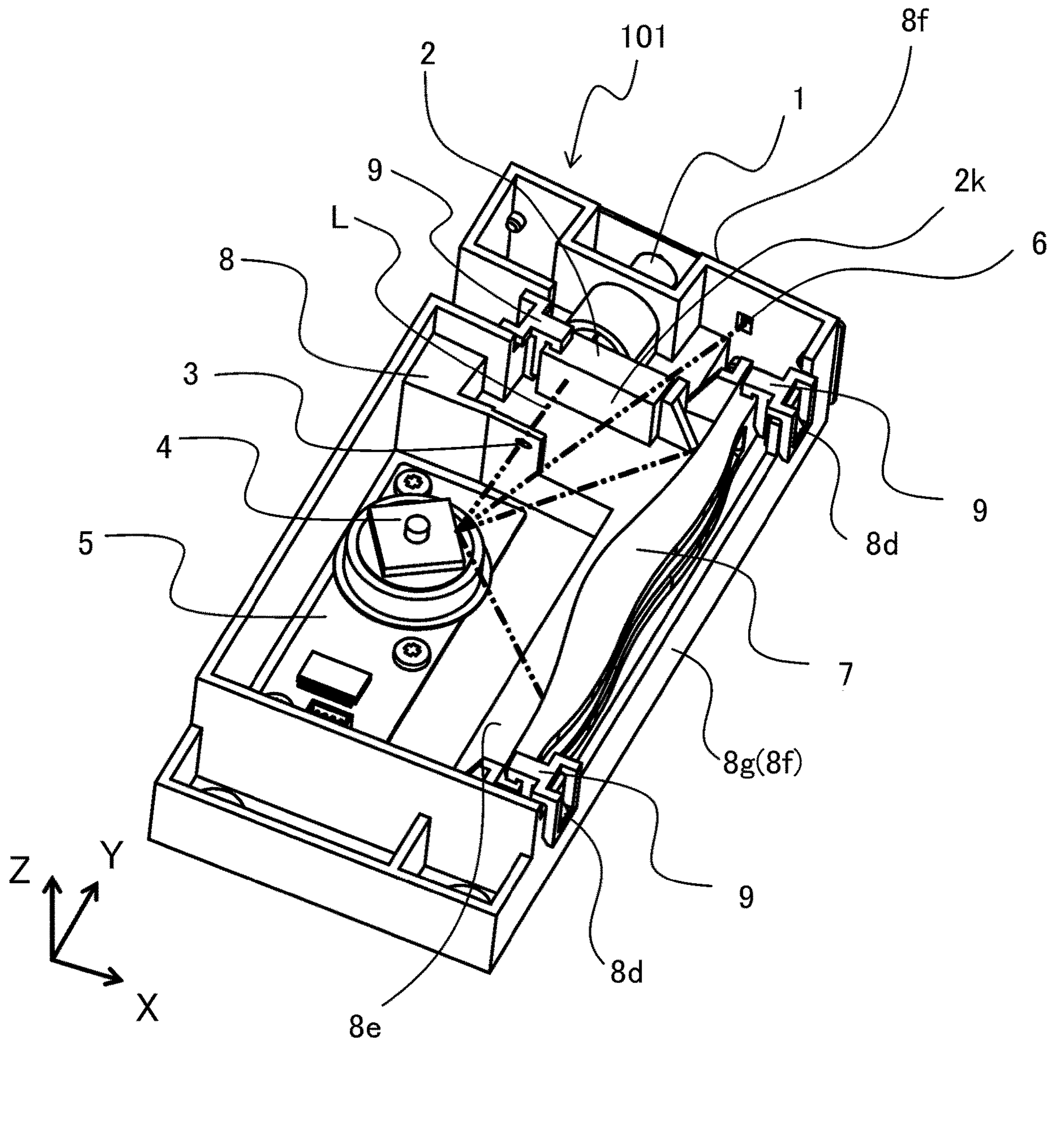
FIG. 2 is a perspective view of the optical scanning device of the Embodiment 1.

FIG. 2 is a perspective view of the optical scanning device 101. In the description below, a direction in which the laser beam scans the photosensitive drum 103, in other words, a rotational axis direction of the photosensitive drum 103 is defined as a main scanning direction. In addition, a direction perpendicular to the main scanning direction, in other words, a rotational direction of the photosensitive drum 103 is defined as a sub scanning direction. Furthermore, the main scanning direction is defined as a Y direction, a rotational axis direction of a rotating polygon mirror 4 in a virtual plane perpendicular to the Y direction is defined as a Z direction, and a direction perpendicular to the Y direction and the Z directions is defined as a X direction. The X direction is also an optical axis direction of an fθ lens 7, which will be described later.

The optical scanning device 101 is provided with a laser unit 1, which is a light source, a deflecting device 5 (deflector), an optical box 8, which is a casing made of resin accommodating the fθ lens 7, which is an optical element made of resin, and a cover member 12 (see FIG. 1) which covers the optical box 8. Inside the optical box 8, the laser unit 1, a compound anamorphic collimator lens 2, an aperture diaphragm 3, the deflecting device 5 including the rotating polygon mirror 4, a sensor 6, and the fθ lens 7 (scanning lens) are disposed. In more detail, the optical box 8 includes a bottom surface 8*e* and an outer wall 8*f*, which is a side wall standing from the bottom surface 8*e*. On the bottom surface 8*e* of the optical box 8, the deflecting device 5, the fθ lens 7, the compound anamorphic collimator lens 2, etc. are disposed. On the outer wall 8*f* of the optical box 8, the laser unit 1 is disposed. The optical box 8 includes an opening formed by the outer wall 8*f*, and the deflecting device 5 etc. are disposed on the bottom surface 8*e* via the opening. The opening of the optical box 8 is closed by the cover member 12.

The laser unit 1 (semiconductor laser unit) is a unit which emits the laser light beam. The compound anamorphic collimator lens 2 is a lens which is an anamorphic collimator lens, in which a collimator lens and a cylindrical lens are integrated, and a signal detection lens (hereinafter referred to as a BD lens) 2*k* are integrally molded. The deflecting device 5 is provided with the rotating polygon mirror 4 which deflects and scans a laser light beam L emitted by the laser unit 1, indicated by a two dotted line, and is a device which rotationally drives the rotating polygon mirror 4. The rotating polygon mirror 4 includes a plurality of reflecting surfaces, which are parallel to the Z direction, and, for example, four reflecting surfaces are included in FIG. 2 and on each reflecting surface, the laser beam is reflected.

The laser light beam L emitted from the laser unit 1 is made to be approximately parallel light or converged light in the main scanning direction and the converged light in the sub scanning direction by the compound anamorphic collimator lens 2.

Then, the laser beam L passes through the aperture diaphragm 3, a light beam width thereof is limited, and the laser beam Lis formed as an image in focal line shape which extends long in the main scanning direction on the reflecting surface of the rotating polygon mirror 4. Then, this laser beam L is deflected and scanned by rotating the rotating polygon mirror 4 and is incident on the BD lens 2*k* of the compound anamorphic collimator lens 2. The laser light beam L passing through the BD lens 2*k* is incident on the sensor 6.

At this time, the laser light beam L is detected by the sensor 6, and a signal (also referred to as a BD signal) is output from the sensor 6 to the control portion 150. The timing at which the BD signal is output is set as a synchronous detection timing for a writing position in the main scanning direction. Then, the laser light beam Lis incident on the fθ lens 7.

The fθ lens 7 is a lens which forms an image of the light beam (laser light beam L) scanned by the deflecting device 5 on a surface of the photosensitive drum 103. The fθ lens 7 is designed to focus the laser light beam L to form a spot on the photosensitive drum 103 and to keep a scanning speed of the spot at constant speed. To obtain these characteristics of the fθ lens 7, the fθ lens 7 is formed with an aspheric surface lens. The laser light beam L passing through the fθ lens 7 emits from an emergent port of the optical box 8 and is scanned to form the image on the photosensitive drum 103.

By the rotation of the rotating polygon mirror 4, the laser light beam Lis deflected and scanned, and a main scanning is performed by the laser light beam on the photosensitive drum 103, and a sub scanning is performed by the photosensitive drum 103 being rotationally driven about cylindrical axis line thereof. In this manner, the electrostatic latent image is formed on the surface of photosensitive drum 103. The fixing member 9 positions the fθ lens 7 to the optical box 8 and fixes an end portion in the longitudinal direction (also the Y direction) of the fθ lens 7. The fixing member 9 will be described below. The optical box 8, the fθ lens 7 and the fixing member 9 are made of resin.

[Fixing Member]

Figure 3:
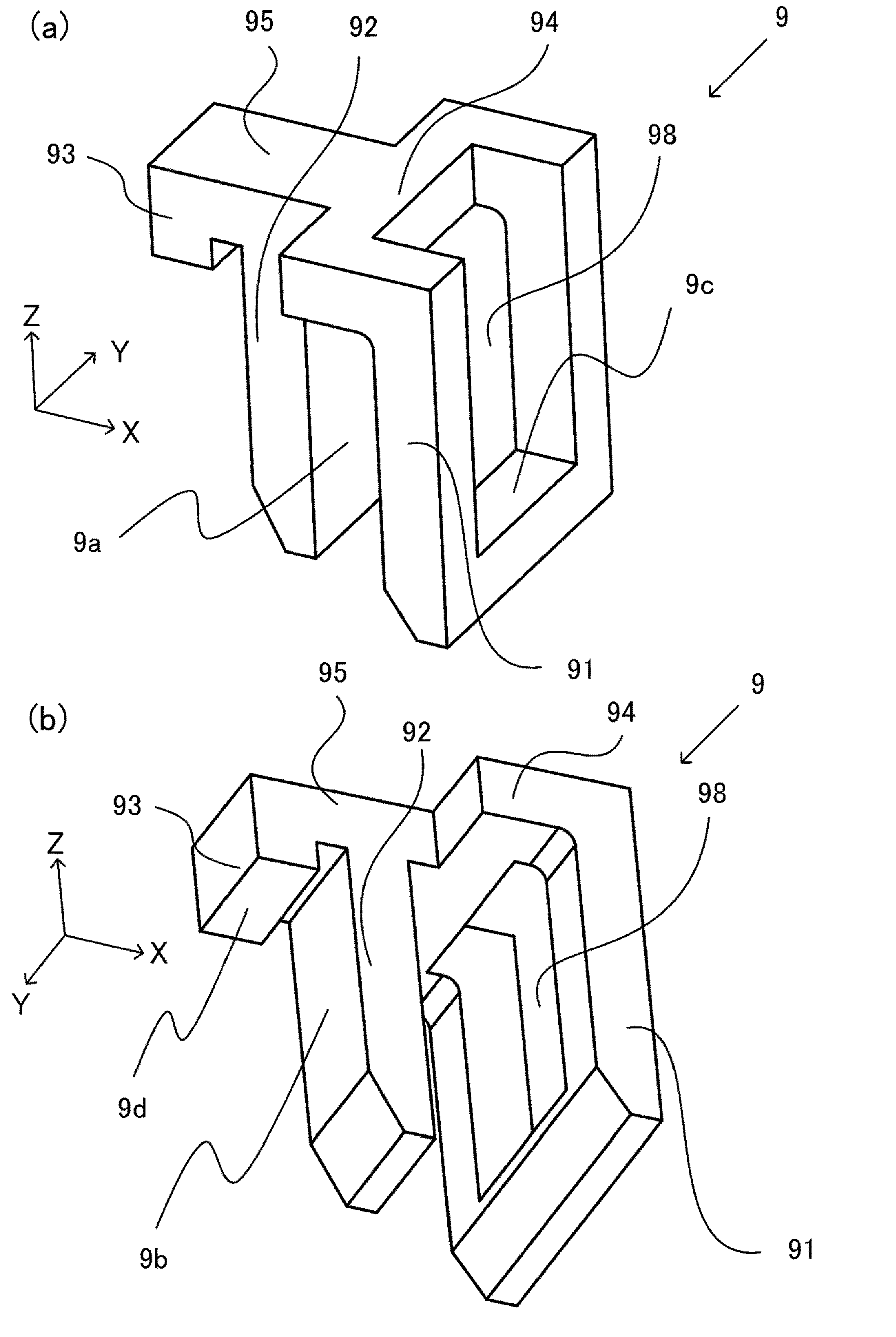
FIG. 3 is a perspective view illustrating a fixing member of the Embodiment 1.

A configuration of the fixing member 9 will be described in detail using FIG. 3. FIG. 3 is a view illustrating the configuration of the fixing member 9 of the Embodiment 1. In FIG. 3, the X direction, the Y direction and the Z direction are shown in conjunction with a state in which the fixing member 9 is fixing the end portions on both sides in the longitudinal direction of the fθ lens 7 in FIG. 2. Part (a) of FIG. 3 is a view of the fixing member 9 looking down from obliquely above and part (b) of FIG. 3 is a view of the fixing member 9 looking up from obliquely below.

The fixing member 9 includes a first part 91, a second part 92, a third part 93, a fourth part 94 and a fifth part 95. The first part 91 is a part extending toward the bottom surface 8*e* of the optical box 8 in a state in which the fixing member 9 is mounted on the optical box 8. The first part 91 includes an engaged portion 9*c* which engages with the optical box 8.

The second part 92 is a part extending in a direction toward the bottom surface 8*e* of the optical box 8 in the state in which the fixing member 9 is mounted on the optical box 8, and is approximately parallel to the first part 91 in the extending direction. The second part 92 includes a positioned surface 9*a*, which is a first surface, and a pressing surface 9*b*, which is a second surface. The positioned surface 9*a* is a surface facing the first part 91 and is in contact with the optical box 8. The pressing surface 9*b* is a surface of an opposite side to the positioned surface 9*a* in the second part 92 and presses the fθ lens 7. The positioned surface 9*a* and the pressing surface 9*b* are parallel to a YZ plane and perpendicular to the X direction in the state in which the fixing member 9 is mounted on the optical box 8.

The third part 93 is a part extending toward the bottom surface 8*e* of the optical box 8 in the state in which the fixing member 9 is mounted on the optical box 8. Incidentally, a length of the third part 93 in the Z direction is shorter than those of the first part 91 and the second part 92. The third part 93 includes a pressing surface 9*d*, which is a third surface pressing the fθ lens 7 in a negative direction of a Z axis. In addition, the first part 91, the second part 92 and third part 93 are provided in the fixing member 9 in an order of the first part 91, the second part 92 and third part 93 as it goes from the outer wall 8*f* of the optical box 8 to an interior of the optical box 8 in the state in which the fixing member 9 is mounted on the optical box 8.

The fourth part 94 is a part connecting the first part 91 and the second part 92. In a part of the fourth part 94 and a part of the first part 91, a hole 98 of a continuous rectangular shape is provided, and a part of an edge portion forming the hole 98 constitutes the engaged portion 9*c*. The fifth part 95 is a part continuous from the fourth part 94 and connects the second part 92 and the third part 93. In addition, the fixing member 9 is made of resin, which is formed by injection molding.

[Fθ Lens]

Figure 4:
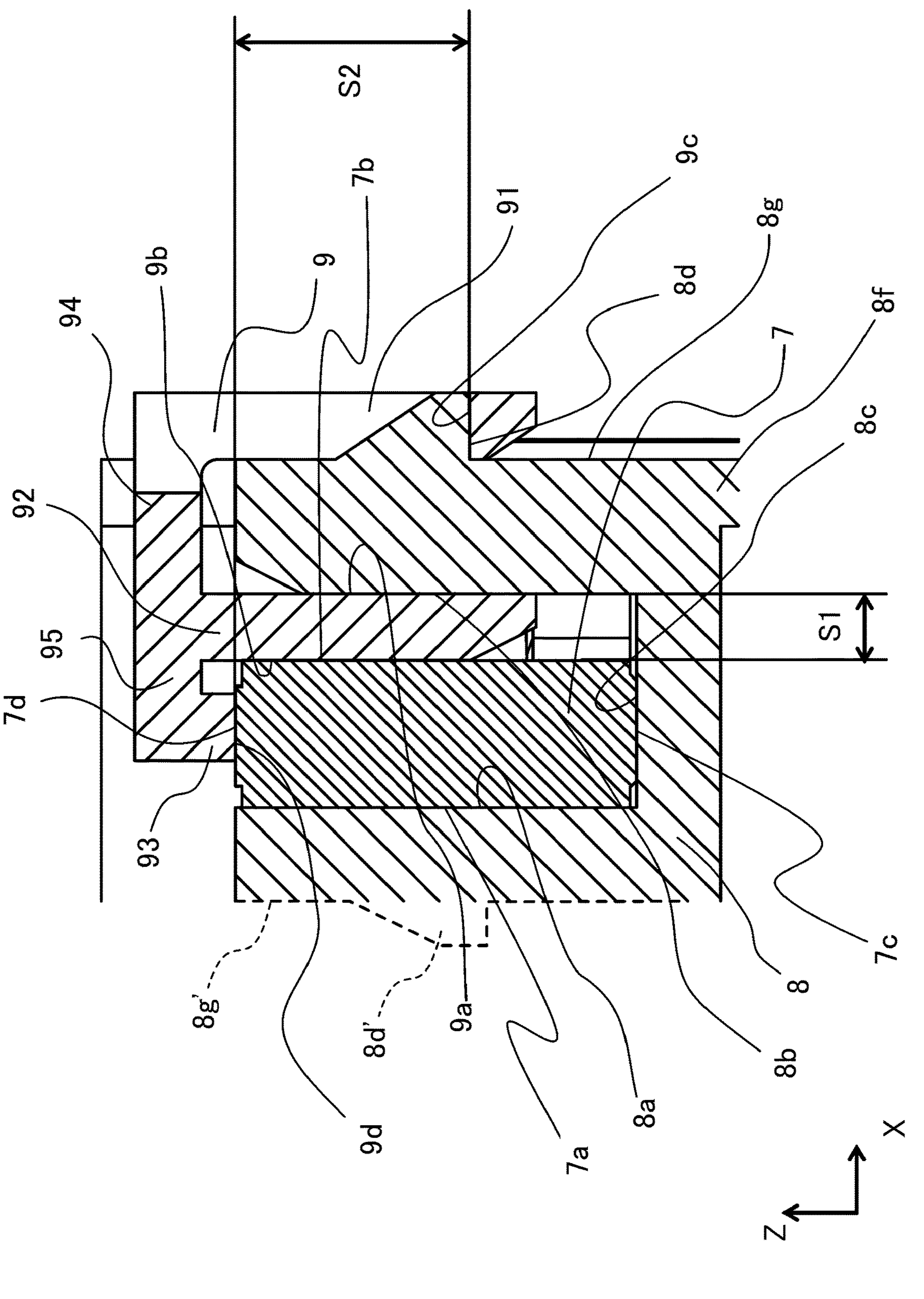
FIG. 4 is an X-Z cross-sectional view of the optical scanning device of the Embodiment 1 shown in FIG. 2.

FIG. 4 illustrates an X-Z cross-sectional view at a position of the fixing member 9 fixing the fθ lens 7 in the optical scanning device 101 shown in FIG. 2. In the Embodiment 1, the fθ lens 7, the optical box 8 and the fixing member 9 are all made of resin, and all of thermal expansion coefficient thereof are similar.

The fθ lens 7 includes a positioned surface 7*a*, which is in contact with the optical box 8, and a pressed surface 7*b*, which is in contact with the fixing member 9. The fθ lens 7 has a shape longer in the main scanning direction. The positioned surface 7*a* is an incident surface on which the laser beam deflected by the rotating polygon mirror 4 is incident. The pressed surface 7*b* is an emergent surface from which the laser beam incident on the fθ lens 7 emits. The fθ lens 7 includes a positioned surface 7*c*, which is in contact with the bottom surface 8*e* of the optical box 8, and a pressed surface 7*d*, which is in contact with the fixing member 9. The positioned surface 7*c* is a first crossing surface crossing, specifically, approximately perpendicular to, the positioned surface 7*a* and the pressed surface 7*b*. The pressed surface 7*d* is a second crossing surface crossing the positioned surface 7*a* and the pressed surface 7*b*. The pressed surface 7*d* is a surface on an opposite side to the positioned surface 7*c*, in other words, a surface opposite to the cover member 12.

Thus, the fθ lens 7 includes the positioned surface 7*a*, which is the incident surface permitting the incidence of the light beam deflected and scanned by the deflecting device 5, and the pressed surface 7*b*, which is the emergent surface permitting the emission of the light beam. The fθ lens 7 further includes the positioned surface 7*c*, which is the first crossing surface contacting the bottom surface 8*e* in the state in which the fθ lens 7 is fixed by the fixing member 9 and crossing the positioned surface 7*a* and the pressed surface 7*b*. The ft lens 7 further includes the pressed surface 7*d*, which is the second crossing surface crossing the positioned surface 7*a* and the pressed surface 7*b* and opposite to the positioned surface 7*c*.

[Optical Box]

The outer wall 8*f* of the optical box 8 includes, in more detail, a side surface 8*g* of an outside of the optical box 8 and a positioning surface 8*b*, which is a second contacting surface of an inside of the optical box 8. The optical box 8 includes a positioning surface 8*a*, which is in contact with the fθ lens 7, and the positioning surface 8*b*, which is in contact with the fixing member 9. The positioning surface 8*a* is a first contacting surface contacting the positioned surface 7*a* (incident surface) in the state in which the fθ lens 7 is disposed in the optical box 8. The positioning surface 8*b* is the second contacting surface opposite to the pressed surface 7*b* (emergent surface) with forming a gap of a distance S1 therebetween, which will be described below, in a state in which the fθ lens 7 is not fixed by the fixing member 9. The positioning surface 8*b* is in contact with the positioned surface 9*a* of the fixing member 9 in the state in which the fθ lens 7 is fixed by the fixing member 9. The optical box 8 includes a positioning portion 8*c*, which is in contact with the fθ lens 7, and an engaging portion 8*d*, which is projecting in the X direction from an outer peripheral surface (outer wall 8*f*) of the optical box 8 and engaging with the fixing member 9.

Thus, the optical box 8 includes the positioning surface 8*a*, which is the first contacting surface contacting the positioned surface 7*a* in the end portion of the fθ lens in the longitudinal direction in the state in which the fθ lens 7 is fixed by the fixing member 9. The optical box 8 includes the side surface 8*g* of the outside of the optical box 8 in the outer wall 8*f* and the positioning surface 8*b*, which is the second contacting surface of the inside of the optical box 8 in the outer wall 8*f*. In addition, the side surface 8*g* includes the engaging portion 8*d*, which is a projecting portion projecting toward the outside of the optical box 8.

[Fixing Method]

A fixing method of the fθ lens 7 in the X direction (also the optical axis direction) will be described. After the fθ lens 7 is mounted on the optical box 8, the fixing member 9 is assembled to the optical box 8 in an assembly direction (−Z direction). As a result, the positioned surface 9*a* of the fixing member 9 contacts the positioning surface 8*b* of the optical box 8, and the pressing surface 9*b* of the fixing member 9 presses the pressed surface 7*b* of the fθ lens 7. As a result, the fθ lens 7 is positioned with the positioned surface 7*a* being abutted by the positioning surface 8*a* of the optical box 8. Due to the above, the positioning in the X direction is completed.

Next, the fixing method of the fθ lens 7 in the Z direction will be described. The fixing member 9 includes the engaged portion 9*c* engaging with the optical box 8 and the pressing surface 9*d* pressing the fθ lens 7. The engaging portion 8*d* and the engaged portion 9*c* are of so-called snap-fit structures.

After the fθ lens 7 is mounted on the optical box 8, by the fixing member 9 being assembled to the optical box 8 in the assembly direction (−Z direction), the pressing surface 9*d* of the fixing member 9 presses the pressed surface 7*d* of the fθ lens 7. As a result, the fθ lens 7 is positioned with the positioned surface 7*c* being abutted by the positioning surface 8*c* of the optical box 8. Retaining of the fixing member 9 in the +Z direction is realized by the engaged portion 9*c* of the fixing member 9 engaging with the engaging portion 8*d* of the optical box 8. Incidentally, the Y direction of the fθ lens 7 is positioned by a fitted portion of the fθ lens 7 (not shown) and a fitting portion of the optical box 8 (not shown) being fitting with each other.

A temperature inside the optical scanning device 101 varies due to a change in a temperature of a space in which the image forming apparatus 110 is installed, rise in the temperature due to long time printings, etc. When the temperature inside the optical scanning device 101 changes, the distance S1 between the pressed surface 7*b* of the fθ lens 7 and the positioning surface 8*b* of the optical box 8 in the X direction changes according to the thermal expansion coefficient of the fθ lens 7 and the optical box 8. Similarly, a distance S2 between the pressed surface 7*d* of the fθ lens 7 and the engaging portion 8*d* of the optical box 8 in the Z direction changes. As described above, the fθ lens 7, the optical box 8, and the fixing member 9 are each made of resin and have the similar thermal expansion coefficients.

Therefore, in the X direction, difference between the change in the distance S1 and a change in a distance between the positioning surface 9*a* and the pressing surface 9*b* of the fixing member 9 is small. Similarly, in the Z direction, difference between the change in the distance S2 and a change in a distance between the engaged portion 9*c* and the pressing surface 9*d* of the fixing member 9 is small. Therefore, it becomes possible to reduce a change in pressing force of the fixing member 9 to the fθ lens 7 in both the X direction and the Z direction, and to urge the fθ lens 7 stably. By this, it becomes possible to reduce misalignment and deformation of the fθ lens 7 and to prevent degradation of optical performance of the fθ lens 7. As a result, the optical scanning device 101 can form the stable latent image.

Incidentally, by the fixing member 9 positioning and fixing the Z direction and the X direction of the fθ lens 7, it becomes possible to simplify the assembly of the fθ lens 7, thereby reducing a number of assembly workloads and increasing productivity. In addition, since the shape of the fixing member 9 is small and simple, it becomes possible to reduce component cost and mold cost.

In addition, the engaging portion 8*d* of the optical box 8 is formed on the outer peripheral surface of the optical box 8 which surrounds the fθ lens 7, therefore it is not necessary to provide a pinch off hole in a cavity and a core inside the optical box 8. Therefore, it becomes possible to prevent a foreign substance from entering inside the optical box 8 from outside, and there is no need to incur additional cost for a sealing member to block an air path to inside the optical box 8, etc.

As described above, according to the Embodiment 1, it becomes possible to reduce the misalignment and the deformation in the assembly of the fθ lens with an inexpensive configuration, and to realize the optical scanning device with high accuracy and high reliability.

[Fixing of Other Optical Elements]

In addition, the configuration in which the fixing member 9 is applied to the fθ lens 7, which is a scanning lens, has been described, however, the same effect can be obtained when the fixing member 9 is applied to other optical elements such as the compound anamorphic collimator lens 2 as shown in FIG. 2. In other words, in FIG. 4, the fθ lens 7 may be replaced by the other optical element. The other optical element should include a surface contacting the bottom surface 8*e* (positioning surface 8*c*) of the optical box 8 and a surface contacting the positioning surface 8*a*, which stands in the Z direction from the bottom surface 8*e* of the optical box 8. Also, the other optical element should include a surface of an opposite side to the surface contacting the positioning surface 8*a* in the X direction (corresponding to the pressed surface 7*b*) and a surface of an opposite side to the surface contacting the bottom surface 8*e* (corresponding to the pressed surface 7*d*). In addition, the optical box 8 should include the engaging portion 8*d* engaging with the engaged portion 9*c* of the fixing member 9 at a position to which the other optical element is set. As shown in FIG. 2, one end portion of the compound anamorphic collimator lens 2 in the longitudinal direction (X direction) is fixed by the fixing member 9. Thus, by fixing at least the one end portion of the optical element in the longitudinal direction with the fixing member 9, it becomes possible to reduce the misalignment and the deformation caused by the change in temperature.

Modified Examples of the Embodiment 1

Figure 5:
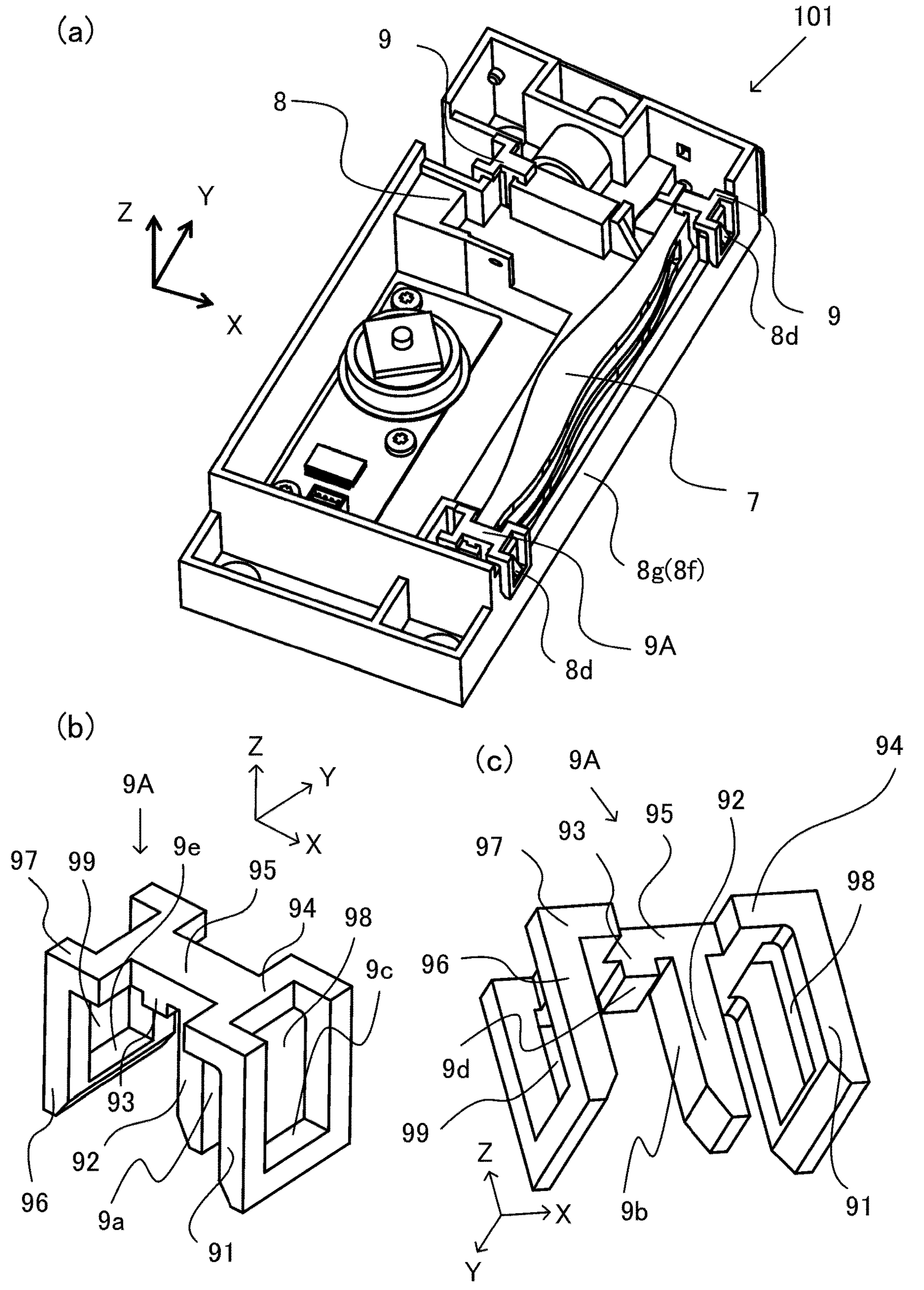
FIG. 5 is a perspective view of the optical scanning device illustrating a Modified Example of the Embodiment 1, and a perspective view illustrating the fixing member.
Figure 6:
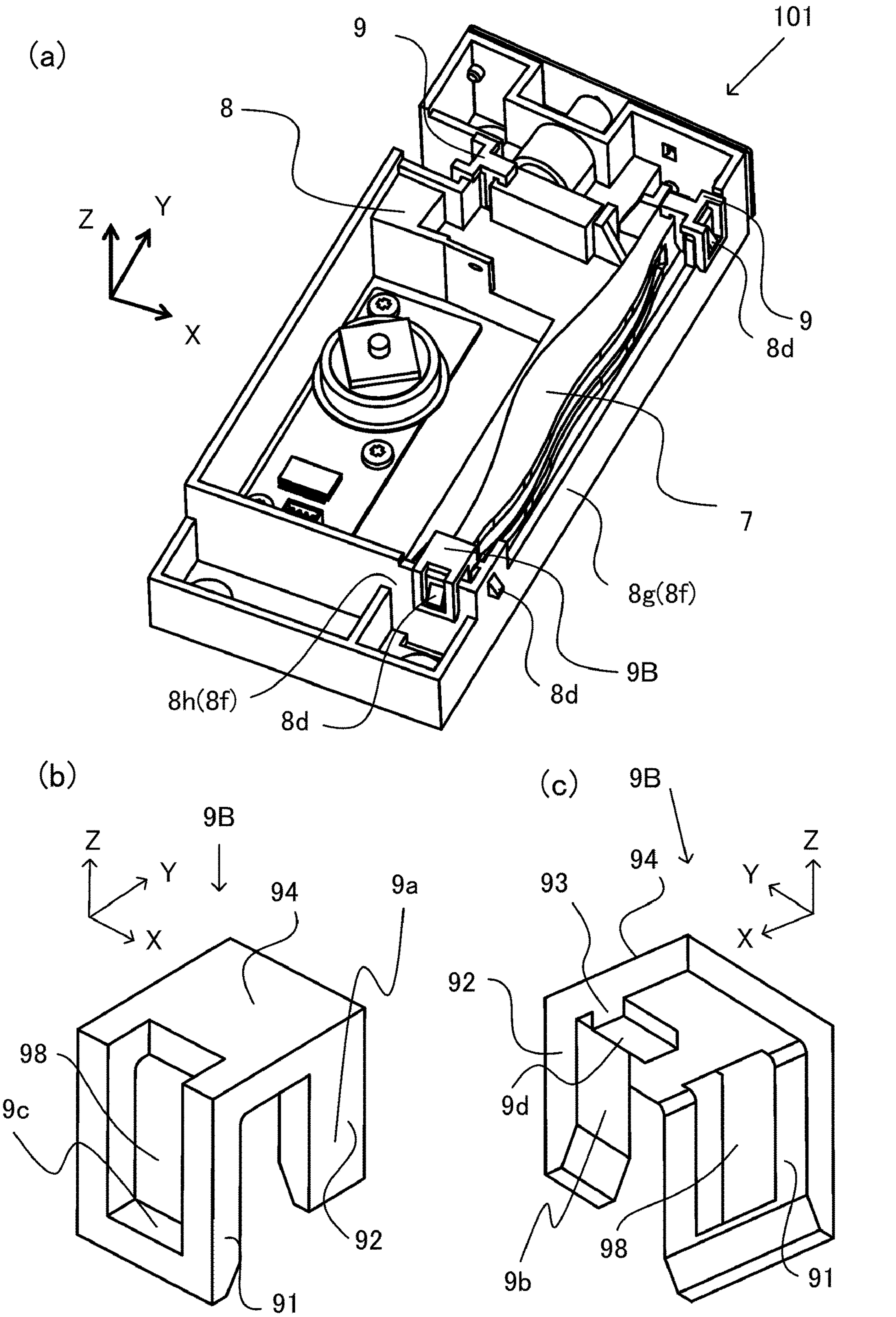
FIG. 6 is a perspective view of the optical scanning device illustrating a Modified Example of the Embodiment 1, and a perspective view illustrating the fixing member.

Part (a) of FIG. 5 is a perspective view of the optical scanning device 101 illustrating a Modified Example 1 of the Embodiment 1. Part (b) of FIG. 5 is a view of a fixing member 9A looking down from obliquely above, and part (c) of FIG. 5 is a view of the fixing member 9A looking up from obliquely below. In addition, part (a) of FIG. 6 is a perspective view of the optical scanning device 101 illustrating a Modified Example 2 of the Embodiment 1. Part (b) of FIG. 6 is a view of a fixing member 9B looking down from obliquely above, and part (c) of FIG. 6 is a view of the fixing member 9B looking up from obliquely below. The same functions and shapes as those in the Embodiment 1 are indicated with the same reference numeral, and the description thereof will be omitted. These are Modified Examples of the engaging portion 8*d* of the optical box 8 described in the Embodiment 1.

Modified Example 1

The fixing member 9A in FIG. 5 has the first part 91, the second part 92, the third part 93, the fourth part 94, and the fifth part 95, which are the same as the fixing member 9 in FIG. 3. The same is true for the first part 91 including the engaged portion 9*c*, the second part 92 including the positioning surface 9*a* and the pressing surface 9*b*, and the third part 93 including the pressing surface 9*d*.

The fixing member 9A includes a sixth part 96 and a seventh part 97. The sixth part 96 is a part extending toward the bottom surface 8*e* of the optical box 8 in a state in which the fixing member 9A is mounted on the optical box 8. The sixth part 96 includes an engaged portion 9*e* engaging with the optical box 8. The seventh part 97 is a part connecting the third part 93 and the sixth part 96. In a part of the seventh part 97 and a part of the sixth part 96, a hole 99 of a continuous rectangular shape is provided, and a part of the hole 99 constitutes the engaged portion 9*e*. The fixing member 9A is also made of resin, which is formed by injection molding.

In part (a) of FIG. 5, a plurality of engaging portions 8*d* of the optical box 8 are provided in the X direction toward which the fixing member 9A presses the fθ lens 7. In other words, the fixing member 9A includes a second engaged portion 9*e* also on an opposite side of the engaged portion 9*c* in the X direction with the pressing surface 9*b* as a reference. In the optical box 8, an engaging portion (not shown), which is similar to the engaging portion 8*d*, engaging with the engaged portion 9*e* of the fixing portion 9A is provided. By this, the fθ lens 7 is sandwiched between the engaged portion 9*c* and the engaged portion 9*e* in the X direction. The fixing member 9A, which includes the two engaged portions, as shown in FIG. 5, is mounted so as to sandwich a widthwise direction perpendicular to the longitudinal direction of the optical element (e.g., fθ lens 7). In this case as well, the same effect as in the Embodiment 1 as described above can be obtained.

Thus, in the Modified Example 1, when the engaging portion 8*d* is defined as a first projecting portion and the engaged portion 9*c* is defined as a first engaged portion, respectively, the optical box 8 includes a side surface 8*g*', which includes an engaging portion 8*d*', which is a second projecting portion projecting toward an opposite side to the side surface 8*g*'. The fixing portion 9A includes the engaged portion 9*e*, which is a second engaged portion engaging with the engaging portion 8*d*'. The side surface 8*g*' and the engaging portion 8*d*' are shown in FIG. 4 as broken lines. Incidentally, in the Embodiment 1 and the Modified Example 1, the engaging portion 8*d* is provided on the side wall (side surface 8*g*) parallel to the longitudinal direction, and the first part 91 is provided in parallel to the second part 92.

In addition, the fθ lens 7 may be fixed by the fixing member 9A at both ends in the longitudinal direction, or as shown in part (a) in FIG. 5, one end portion of the fθ lens 7 in the longitudinal direction may be fixed by the fixing member 9 and the other end portion may be fixed by the fixing member 9A. In addition, in FIG. 5, the second part 92 of the fixing member 9A is provided on a positive side of the X direction with the third part 93 as a reference, however, it may be provided on a negative side of the X direction or on both sides of the third part 93.

Modified Example 2

In FIG. 6, a case in which the engaging portion 8*d* of the optical box 8 is provided so as to be projecting in the Y direction perpendicular to the X direction, is illustrated. In the fixing member 9 and the fixing member 9A, the first part 91, the second part 92 and the third part 93 are provided in this order from the outer wall 8*f* of the optical box 8 to the interior of the optical box 8 in the state in which the fixing member 9 and the fixing member 9A are mounted on the optical box 8. In addition, the first part 91 and the second part 92 are provided so that the surface, to which the hole 98 of the first part 91 is provided, the positioned surface 9*a*, and the pressing surface 9*b* are parallel to each other.

On the other hand, the fixing member 9B in FIG. 6 includes the first part 91, the second part 92, the third part 93 and the fourth part 94. The same is also true for the first part 91 including the engaged portion 9*c*, the second part 92 including the positioned surface 9*a* and the pressing surface 9*b*, and the third part 93 including the pressing surface 9*d*. However, in a case of the fixing member 9B, the positioned surface 9*a* and the pressing surface 9*b* of the second part 92 are not parallel but perpendicular to the surface to which the hole 98 of the first part 91 is provided. Thus, the engaging portion 8*d* is provided on a side surface 8*h*, which is a side wall perpendicular to the longitudinal direction, and the first part 91 is provided so as to be perpendicular to the second part 92. In this case as well, the same effect as in the Embodiment 1 as described above can be obtained. Incidentally, in FIG. 6, the second part 92 of the fixing member 9B is provided on the positive side of the X direction with respect to the third part 93, however, it may be provided on the negative side of the X direction or on both sides of the third part 93.

In addition, the fθ lens 7 may be fixed by the fixing member 9B at both ends in the longitudinal direction, or as shown in part (a) of FIG. 6, one end portion of the fθ lens 7 in the longitudinal direction may be fixed by the fixing member 9 and the other end portion may be fixed by the fixing member 9B. In addition, one end portion may be fixed by the fixing member 9A. Which of the fixing members 9, 9A or 9B is used to fix the fθ lens 7 may be determined according to a position and a shape of the optical box 8 on which the fθ lens 7 is mounted.

As described above, according to the Embodiment 1, it becomes possible to perform positioning of the lens with low cost and high accuracy, and to provide the optical scanning device with high accuracy and high reliability.

Embodiment 2

[Fixing Member]

Figure 7:
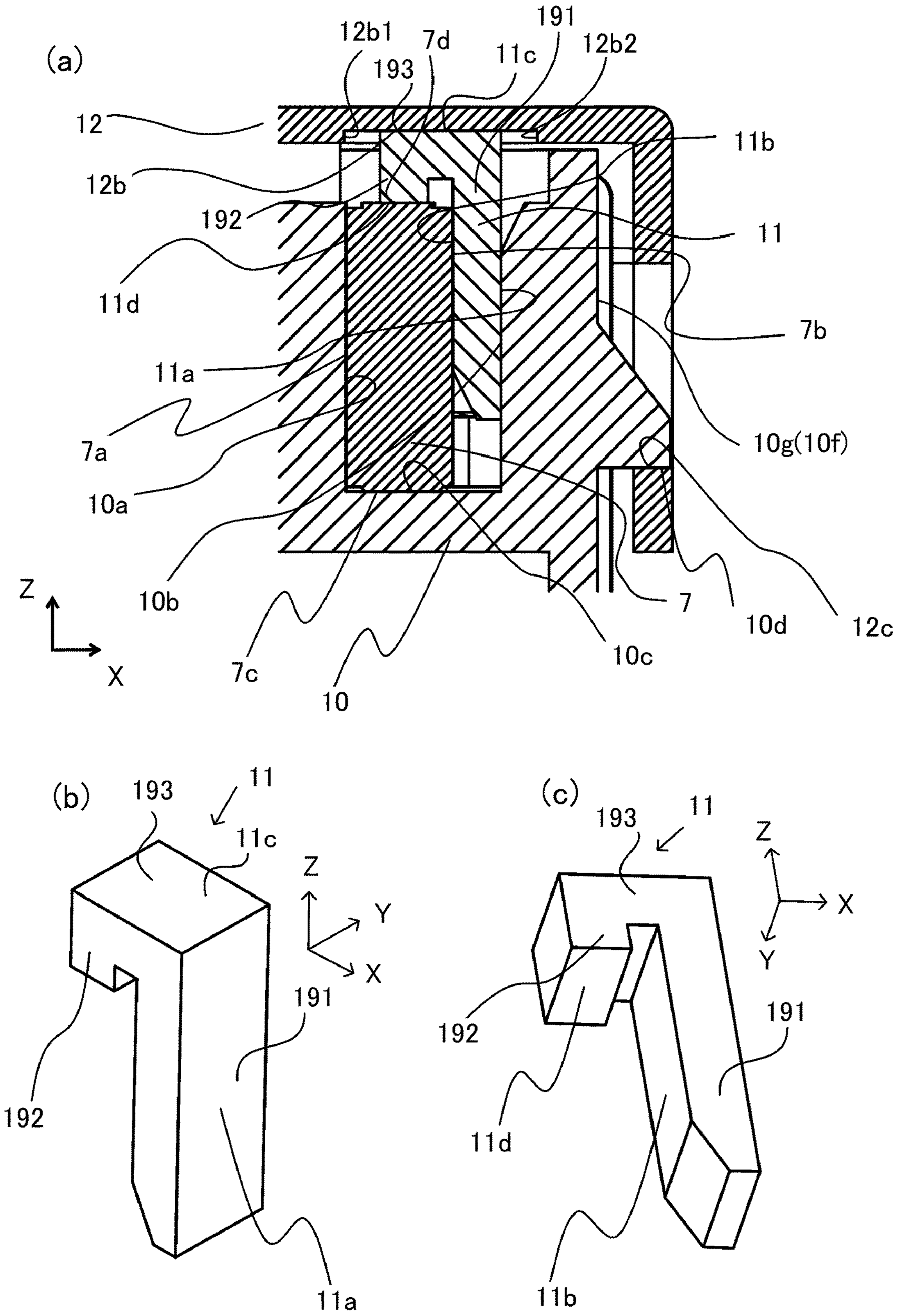
FIG. 7 is an X-Z cross-sectional view of the optical scanning device of an Embodiment 2, and a perspective view illustrating the fixing member.

Part (a) of FIG. 7 illustrates a partially enlarged cross-sectional view illustrating the fixing method of the fθ lens 7 of an Embodiment 2. Part (b) of FIG. 7 is a view of a fixing member 11 looking down from obliquely above, and part (b) of FIG. 7 is a view of the fixing member 11 looking up from obliquely below.

In the fixing members 9, 9A and 9B of the Embodiment 1, the engaged portion 9*c* of the first part 91 engages with the engaging portion 8*d* of the optical box 8 in the state in which the fixing members 9, 9A and 9B are mounted on the optical box 8. On the other hand, the fixing member 11 in FIG. 7 includes a first part 191, a second part 192 and a third part 193, but does not include the first part 91 (and the sixth part 96), which includes the engaged portion 9*c*, which is a part of the edge portion forming the hole 98 (and the hole 99) of the Embodiment 1. The fixing member 11 of the Embodiment 2 includes a contacting surface 11*c* where the third part 193 is in contact with the cover member 12. While the fixing members 9, 9A and 9B of the Embodiment 1 position and support the fθ lens 7 by engaging with the optical box 8, the fixing member 11 of the Embodiment 2 positions and supports the fθ lens 7 by being in contact with the cover member 12.

The fixing member 11 includes the first part 191. The first part includes, in a state in which the fθ lens 7 is fixed to an optical box 10, a positioned surface 11*a*, which is a first surface contacting a positioning surface 10*b*, and a pressing surface 11*b*, which is a second surface contacting the positioned surface 7*a*, and extends toward a bottom surface (corresponding to the bottom surface 8*e*). The fixing member 11 includes, in the state in which the fθ lens 7 is fixed to the optical box 10, the second part 192, which extends toward the bottom surface and includes a pressing surface 11*d*, which is a third surface contacting a positioning surface 10*c*. The fixing member 11 includes the third part 193, which connects the first part 191 and the second part 192 and includes the contacting surface 11*c*, which is a fourth surface contacting a contacting surface 12*b*, which is an inner surface of the cover member 12.

The cover member 12 is a member which covers an opening formed by an outer wall 10*f*, which is a side wall of the optical box 10. The cover member 12 includes the contacting surface 12*b*, which becomes inside in a state of covering the opening. The contacting surface 12*b* is part of a recessed portion, and the contacting surface 11*c* is in contact with the contacting surface 12*b*, which is the part of the recessed portion. The optical box 10 includes an engaging portion 10*d* projecting toward an outside of a side surface 10*g*, and the cover member 12 includes an engaged portion 12*c* engaging with an engaging portion 10*d*.

[Fixing Method]

The optical scanning device 101 of the Embodiment 2 is provided with the fθ lens 7, the optical box 10, the fixing member 11 and the cover member 12. The fixing method of the fθ lens 7 in the X direction (optical axis direction) will be described below.

The fθ lens 7 includes the positioned surface 7*a* contacting the optical box 10, and the pressed surface 7*b* contacting the fixing member 11. The optical box 10 includes a positioning surface 10*a* contacting the fθ lens 7, which is the first contacting surface, and the positioning surface 10*b* contacting the fixing member 11, which is the second contacting surface. The fixing member 11 includes the positioned surface 11*a* contacting the optical box 10 and the pressing surface 11*b* pressing the fθ lens 7. In addition, the fixing member 11 is made of resin, which is formed by injection molding. Since details of the fixing method of the fθ lens 7 in the X direction are the same as in the Embodiment 1, the description will be omitted.

Next, the fixing method of the fθ lens 7 in the Z direction will be described. The fθ lens 7 includes the positioned surface 7*c* contacting the optical box 10 and the pressed surface 7*d* contacting the fixing member 11. The optical box 10 includes the positioning surfaces 10*a* and 10*c*, contacting the fθ lens 7, and the engaging portion 10*d*, which is projecting in the X direction from the outer peripheral surface of the optical box 10 and engaging with the cover member 12. Thus, in the Embodiment 2, the engaging portion 10*d* of the optical box 10 engages with the cover member 12 instead of the fixing member 11. The fixing member 11 includes the contacting surface 11*c* contacting the cover member 12 and the pressing surface 11*d* pressing the fθ lens 7. The cover member 12 includes the engaged portion 12*c* engaging with the optical box and the contacting surface 12*b* contacting the fixing member 11.

Here, the contacting surface 12*b* of the cover member 12 forms, in the cross-sectional view shown in FIG. 7, a recessed portion of U-shape with a wall surface 12*b*1 and a wall surface 12*b*2 parallel to the Z direction, and forms the bottom surface of the recessed portion. In a state in which the contacting surface 11*c* of the fixing member 11 is in contact with the contacting surface 12*b* of the cover member 12, a movement of the fixing member 11 in the X direction is restricted by the wall surface 12*b*1 and the wall surface 12*b*2. Incidentally, a wall surface of the recessed portion is formed in the Y direction as well, and the movement in the Y direction is restricted in the same way.

After the fθ lens 7 is mounted on the optical box 10, by the fixing member 11 being assembled to the optical box 10 in the assembly direction (−Z direction), the pressing surface 11*d* of the fixing member 11 presses the pressed surface 7*d* of the fθ lens 7. As a result, the fθ lens 7 is positioned by the positioned surface 7*c* being abutted by the positioning surface 10*c* of the optical box 10. In addition, by the cover member 12 being assembled to the optical box 10 in this state, the contacting surface 12*b* of the cover member 12 is in contact with the contacting surface 11*c* of the fixing member 11 and retaining of the fixing member 11 in the +Z direction is realized. Along with this, by the engaged portion 12*c* of the cover member 12 engaging with the engaging portion 10*d* of the optical box 10, the cover member 12 is fixed in the Z direction. Incidentally, the Y direction of the fθ lens 7 is positioned in the same configuration as in the Embodiment 1.

In the optical scanning device 101 described above, as in the Embodiment 1, it becomes possible, when the temperature of the optical scanning device 101 changes, to reduce the change in the pressing force of the fixing member 11 to the fθ lens 7 and to urge the fθ lens 7 stably. By this, it becomes possible to reduce misalignment and deformation of the fθ lens 7 and to prevent degradation of the optical performance of the fθ lens 7. As a result, the optical scanning device 101 can form the stable latent image.

In addition, since the cover member 12 engages with the optical box 10 by the engaged portion 12*c* adjacent to the contacting surface 12*b* of the fixing member 11, the cover member 12 can have a function of preventing the fixing member 11 from coming off in a case of receiving strong shock or vibration. In addition, since the contacting surface 12*b* of the cover member 12 with the fixing member 11 is accommodated within a thickness of the cover member 12 by providing a stepped shape in the Z direction (the recessed portion as described above), it becomes possible to make the entire optical scanning device 101 be thinner and downsized.

As described above, according to the Embodiment 2, it becomes possible to perform positioning of the lens with low cost and high accuracy, and to provide the optical scanning device with high accuracy and high reliability.

Modified Example of the Embodiment 2

Figure 8:
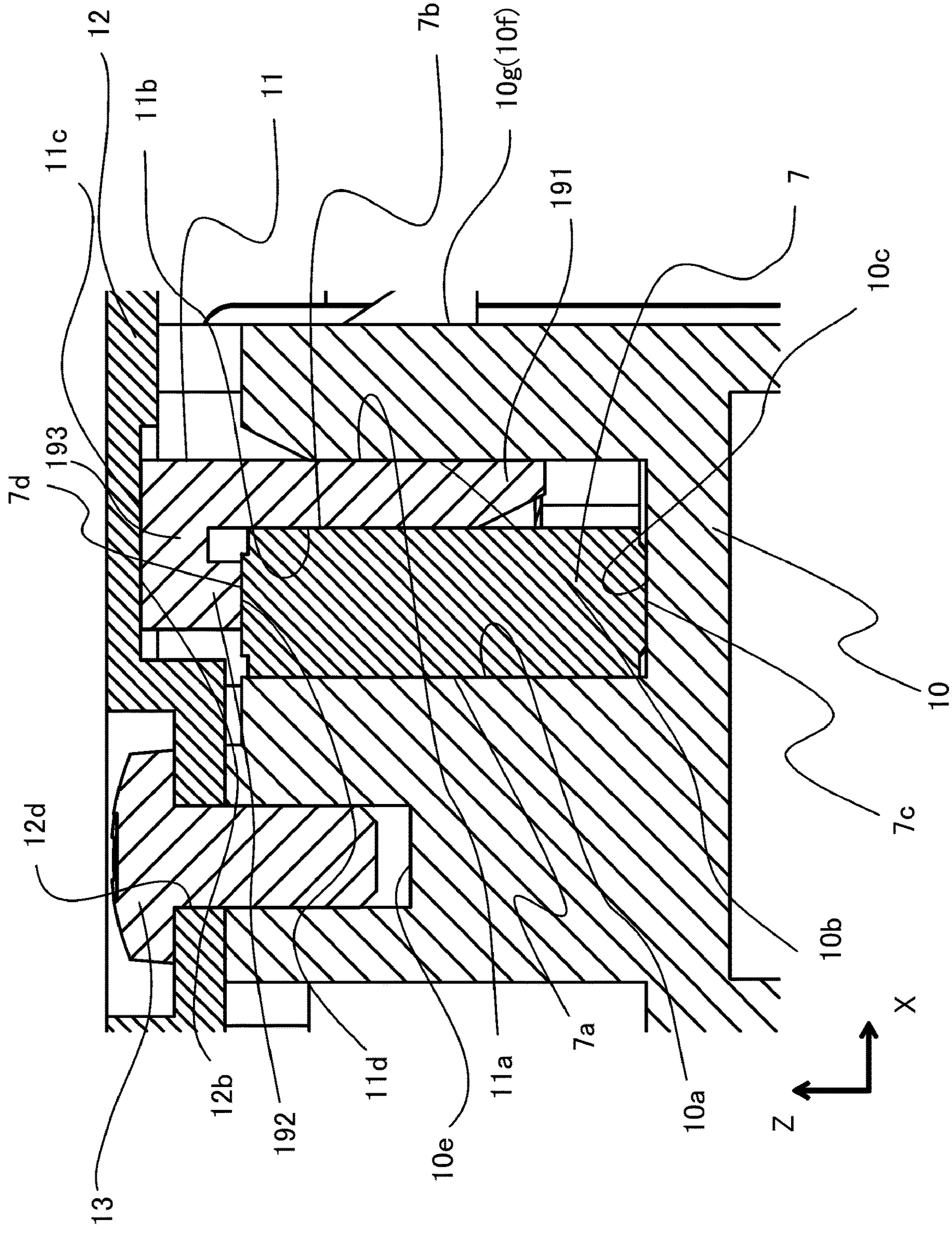
FIG. 8 is a cross-sectional view of the optical scanning device illustrating a Modified Example of the Embodiment 2.

FIG. 8 is a partially enlarged cross-sectional view illustrating a fixing method of the fθ lens 7 showing a Modified Example of the Embodiment 2. The functions and the shapes which are the same as those in the Embodiment 2 are indicated with the same reference numeral, and the description thereof will be omitted. In this Modified Example, instead of having the cover member 12 engaging with the optical box 10 by the snap-fitting as described in the Embodiment 2, a screw 13 is used. In the cover member 12, adjacent to the contacting surface 12*b*, a through hole 12*d*, through which the screw 13 penetrates, is provided. In the optical box 10, adjacent to the positioning surface 10*a*, a hole portion 10*e*, into which the screw 13 is inserted, is provided. Thus, the optical box 10 of the Modified Example includes the hole portion 10*e* adjacent to the positioning surface 10*a*, which is the first contacting surface. The cover member 12 includes the through hole 12*d* in a position corresponding to the hole portion 10*e* in the state of covering the opening. The optical box 10 and the cover member 12 are fixed together by the screw being inserted the through hole 12*d* and the hole portion 10*e*.

As shown in FIG. 8, the same effect as in the Embodiment 2 described above can be obtained as well even in the case in which the cover member 12 is fastened to the optical box 10 by the screw 13 adjacent to the contacting surface 12*b* with the fixing member 11. In addition, the fixing members 9, 9A and 9B of the Embodiment 1 and the fixing member 11 of the Embodiment 2 may be used in a mixed manner.

As described above, according to the Modified Example as well, it becomes possible to perform the positioning of the lens with low cost and high accuracy, and to provide the optical scanning device with high accuracy and high reliability.

Next, other Embodiments which can realize an improvement of positioning accuracy of an optical element such as the fθ lens and a reflecting mirror will be described.

Embodiment 3

(Image Forming Apparatus)

Figure 9:
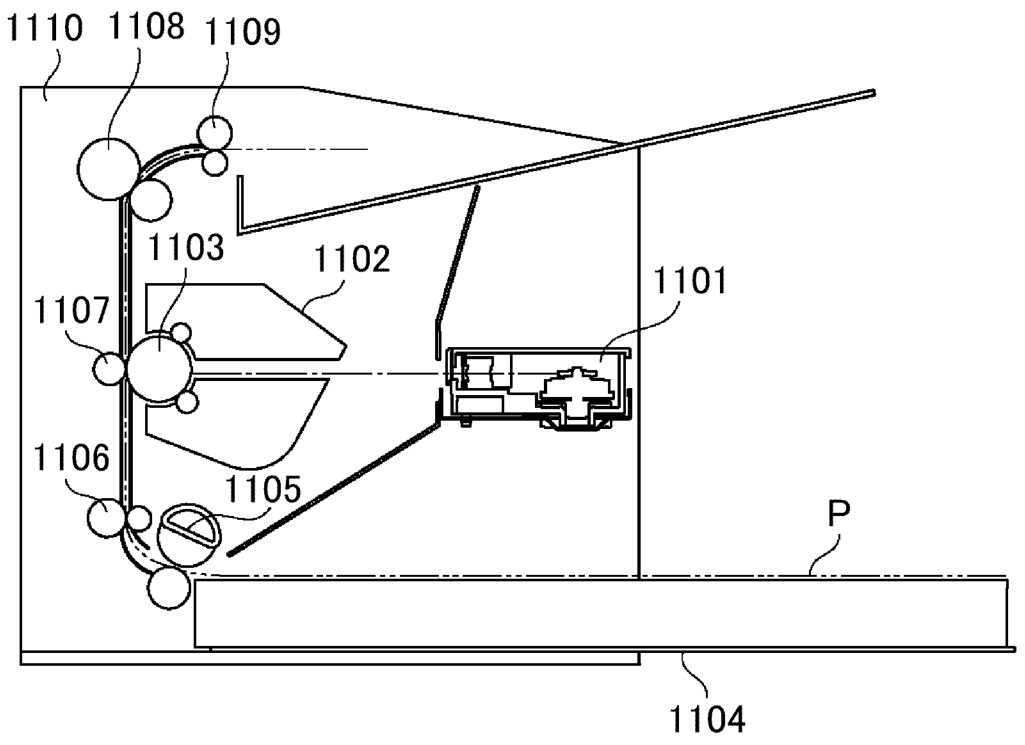
FIG. 9 is a cross-sectional view of the image forming apparatus.

FIG. 9 is a schematic cross-sectional view of an image forming apparatus. Here, as the image forming apparatus, a laser printer forming a toner image on a recording material using an electrophotographic recording technology is exemplified and described.

As shown in FIG. 9, an image forming apparatus 1110 is equipped with the optical scanning device 1101. The optical scanning device 1101 scans a photosensitive drum 1103 built into a process cartridge 1102 with a laser light beam corresponding to image information. On the photosensitive drum 1103 scanned by the laser light beam, an electrostatic latent image is formed. The electrostatic latent image is developed by toner accommodated in the process cartridge 1102. Incidentally, the process cartridge 1102 is a replaceable unit integrating the photosensitive drum 1103 and a charging means, a developing means, etc., as process means acting on the photosensitive drum 1103.

Meanwhile, the recording material P stacked on a sheet feeding tray 1104 is fed with being separated one by one by a feeding roller 1105. Then, the recording material P is conveyed further downstream side by an intermediate roller 1106. On the conveyed recording material P, the toner image formed on the photosensitive drum 1103 is transferred by a transfer roller 1107. The recording material P on which the unfixed toner image is formed is heated and pressurized by a fixing unit 1108, and the toner image is fixed to the recording material P. Then, the recording material P is discharged out of the apparatus by a discharging roller 1109.

(Optical Scanning Device)

Figure 10:
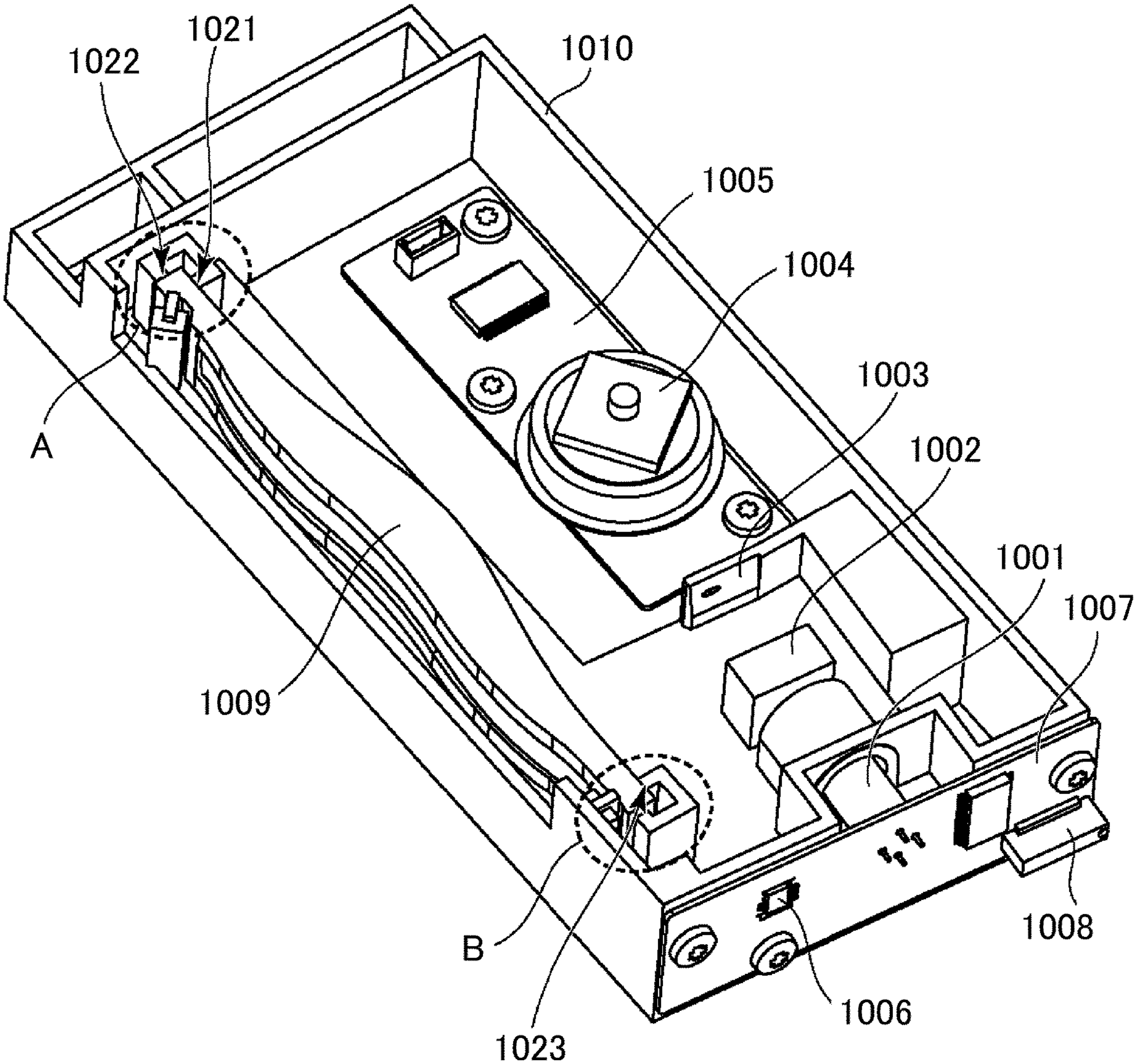
FIG. 10 is a perspective view of the optical scanning device.

Next, the optical scanning device will be described using FIG. 10. 1001 is a semiconductor laser unit which emits the laser light beam, 1002 is an anamorphic collimator lens integrating a collimator lens and a cylindrical lens, and 1003 is an aperture that shapes the laser light beam into a predetermined shape. 1004 is a rotating polygon mirror, 1005 is a driving board for a motor which rotates the rotating polygon mirror, 1006 is a signal detecting sensor, 1007 is a laser control board, 1008 is a signal transmission connector provided on the laser control board, 1009 is an fθ lens (scanning lens, optical element), 1010 is an optical box (casing).

In the above configuration, the laser light beam is emitted from the semiconductor laser unit 1001 according to an image signal received through the signal transmission connector 1008 provided on the laser control board 1007. The laser light beam is converted to parallel light or weakly converged light in the main scanning direction and to converged light in the sub scanning direction by the anamorphic collimator lens 1002. Then, the laser light beam is shaped into a predetermined shape by the aperture 1003, and formed as an image in focal line shape which extends long in the main scanning direction on the reflecting surface of the rotating polygon mirror 1004. Then, this laser light beam is deflected and scanned by the rotating polygon mirror 1004 and is incident on the signal detecting sensor 1006 mounted on the laser control board 1007. At this time, the signal is detected by the signal detecting sensor 1006, and this timing is used as a synchronous detection timing for a writing position in the main scanning direction.

Then, the laser light beam is incident on the fθ lens 1009. The fθ lens 1009 is designed to focus the laser light beam to form a spot on the photosensitive drum 1103 and to keep a scanning speed of the spot at constant speed. To obtain these characteristics of the fθ lens 1009, the fθ lens 1009 is formed with an aspheric surface lens. The laser light beam passing through the fθ lens 1009 emits from the optical box 1010, and is scanned to form the image on the photosensitive drum 1103.

By deflecting and scanning the laser light beam by a rotation of the rotating polygon mirror 1004, scanning in the main scanning direction by the laser light beam is performed on the surface of the photosensitive drum 1103. In addition, a scanning in the sub scanning direction by the laser light beam is performed by the photosensitive drum 1103 rotating about cylindrical axis line thereof. In this manner, the electrostatic latent image is formed on the surface of the photosensitive drum 1103.

Figure 11:
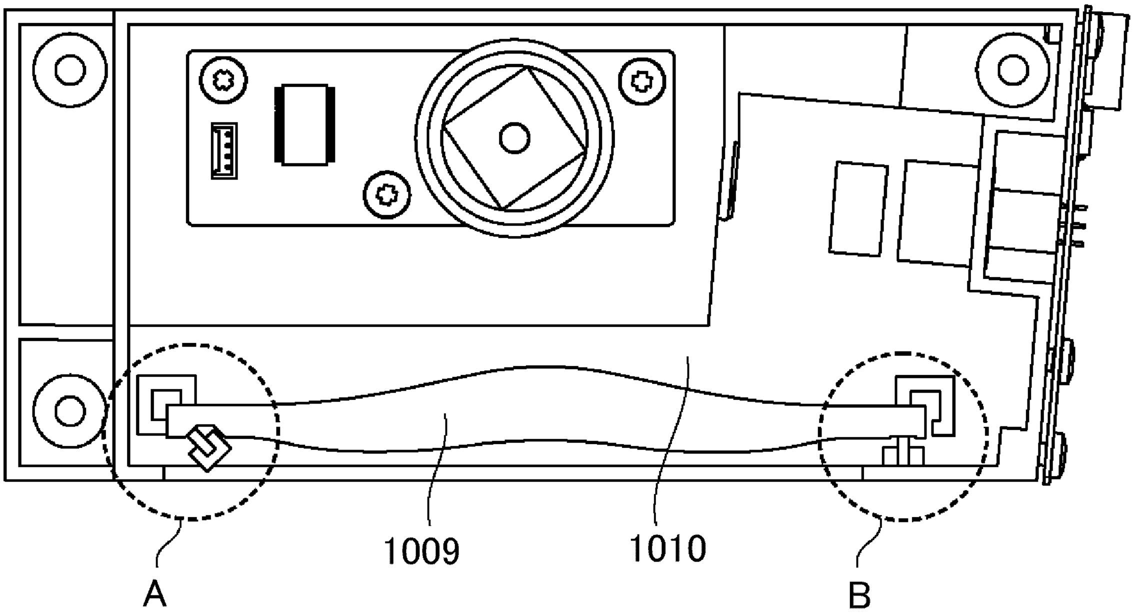
FIG. 11 is a top view illustrating positional relationship between an fθ lens and an optical box.

FIG. 11 is a top view illustrating positional relationship between the fθ lens 1009 and the optical box 1010. To the optical box 1010, in order to fix the fθ lens 1009, a positioning portion A and a positioning portion B of the optical box are provided. The positioning portion A and the positioning portion B are provided adjacent to both end portions of an area through which the laser light beam transmits in the ft lens 1009. The positioning portion A positions a position of an optical axis direction and the main scanning direction of the fθ lens 1009, and the positioning portion B positions a position of the optical axis direction of the fθ lens 1009.

Figure 12:
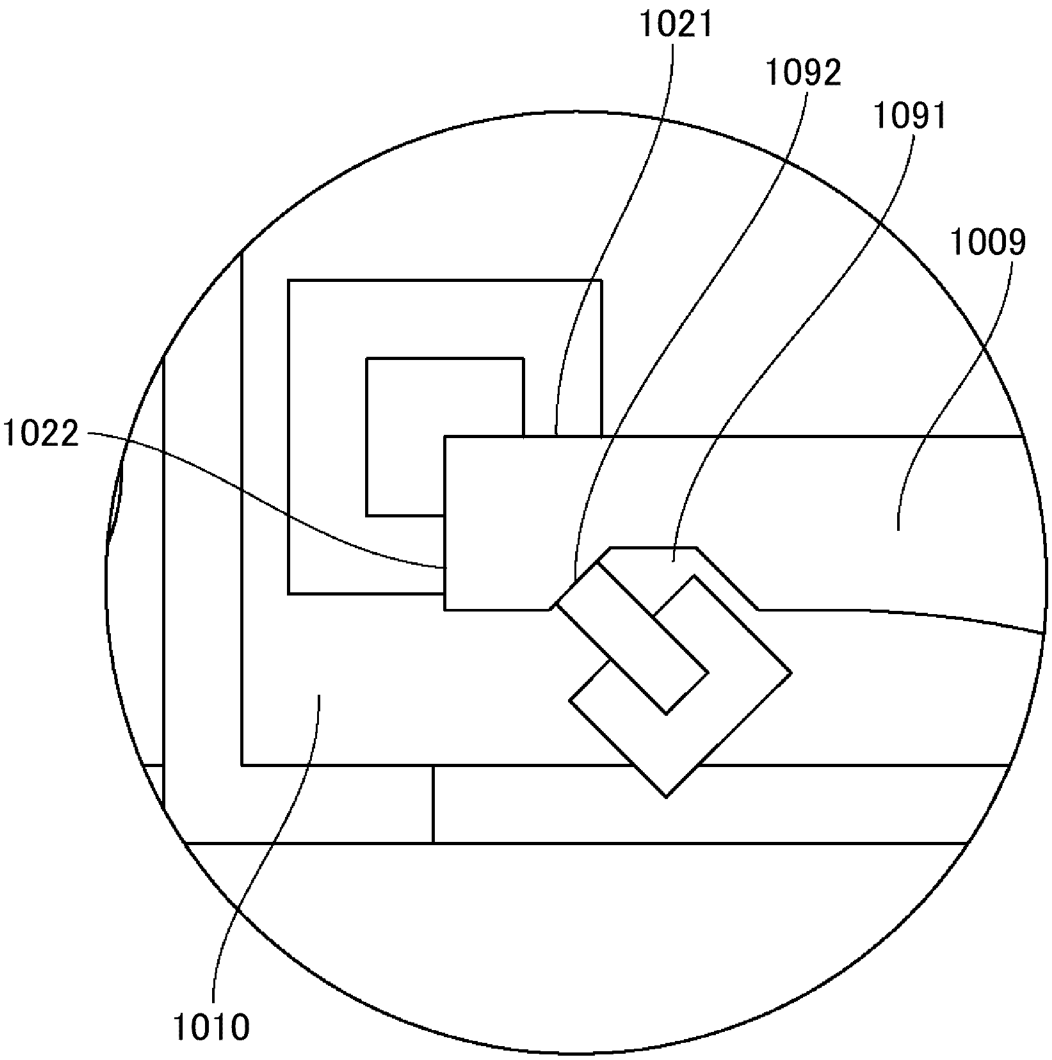
FIG. 12 is an enlarged view of a positioning portion A.

FIG. 12 is an enlarged view of the positioning portion A. To a portion of the optical box 1010 corresponding to the positioning portion A, a positioning portion 1021 and a positioning portion 1022 for positioning the fθ lens 1009 are provided.

The positioning portion 1021 positions of a position of the fθ lens 1009 in the optical axis direction of the laser light beam passing through the fθ lens 1009. The positioning portion 1022 positions the position of the fθ lens 1009 in the main scanning direction. To an end portion of the fθ lens 1009, a lens groove 1091 is provided, and to the lens groove 1091, a pressed surface 1092 is provided. A normal direction of the pressed surface 1092 is set in a different direction from the optical axis direction and the main scanning direction. In the present Embodiment, the normal direction has an angle of 45° relative to the optical axis direction and the main scanning direction, respectively.

Figure 13:
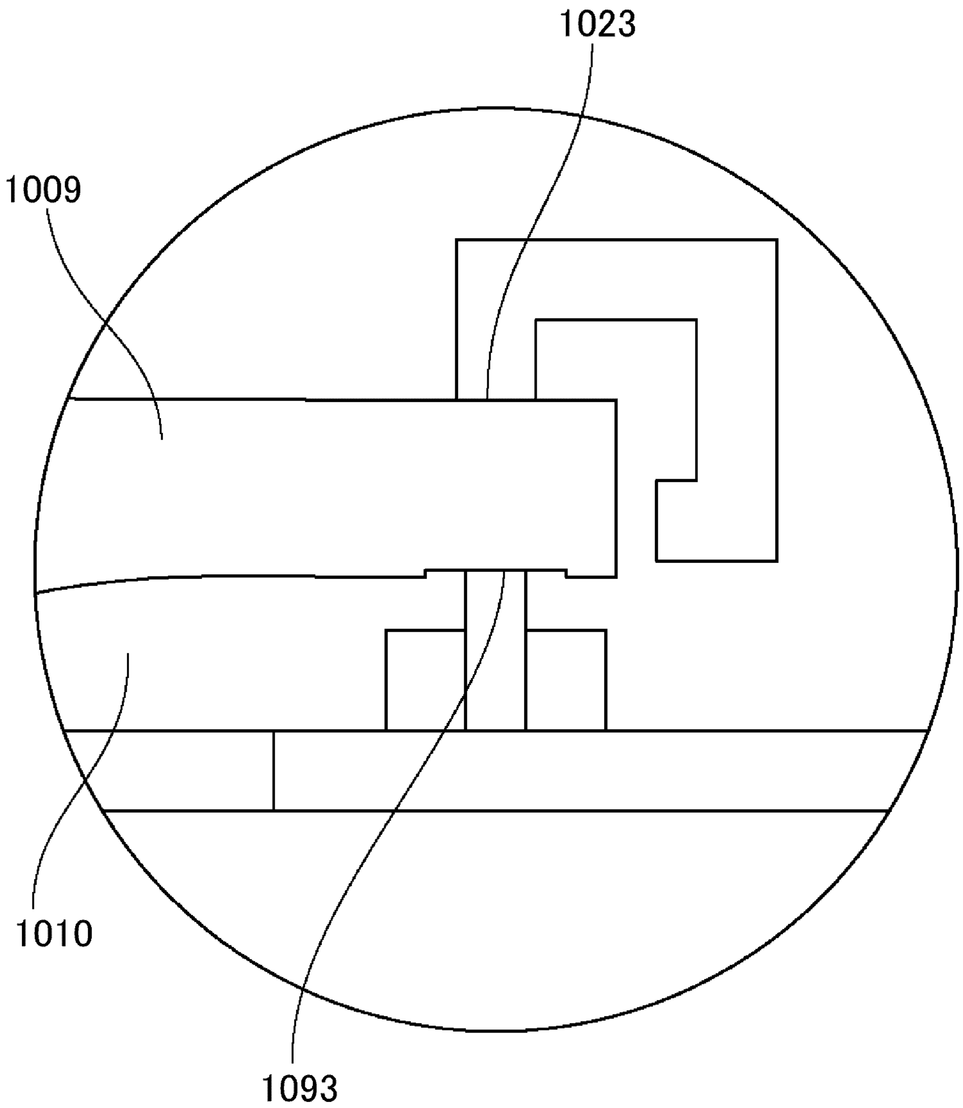
FIG. 13 is an enlarged view of a positioning portion B.

FIG. 13 is an enlarged view of the positioning portion B. In a portion of the optical box 1010 corresponding to the positioning portion B, a positioning portion 1023 is provided for positioning the fθ lens 1009. Adjacent to the end portion of the fθ lens 1009, a pressed surface 1093 of the fθ lens 1009 is provided. The positioning portion 1023 positions the optical axis direction of the fθ lens 1009. By the positioning portion B, only the position in the optical axis direction of the fθ lens 1009 is positioned, and the position in the main scanning direction is not positioned. Thus, the normal direction of the pressed surface 1092 of the one end side (positioning portion A) and a normal direction of the pressed surface 1093 on the other end side (positioning portion B) are different.

In this manner, it is configured that in the positioning portion A, the position of the optical axis direction and the position of the main scanning direction of the fθ lens 1009 is positioned, and in the positioning portion B, the position of the optical axis direction of the fθ lens 1009 is positioned. By this, it becomes possible to fix the fθ lens 1009 to the optical box 1010 without generating distortion on the fθ lens 1009, even in a case in which tolerance variation in an outer shape of the fθ lens 1009 occurs.

Figure 14:
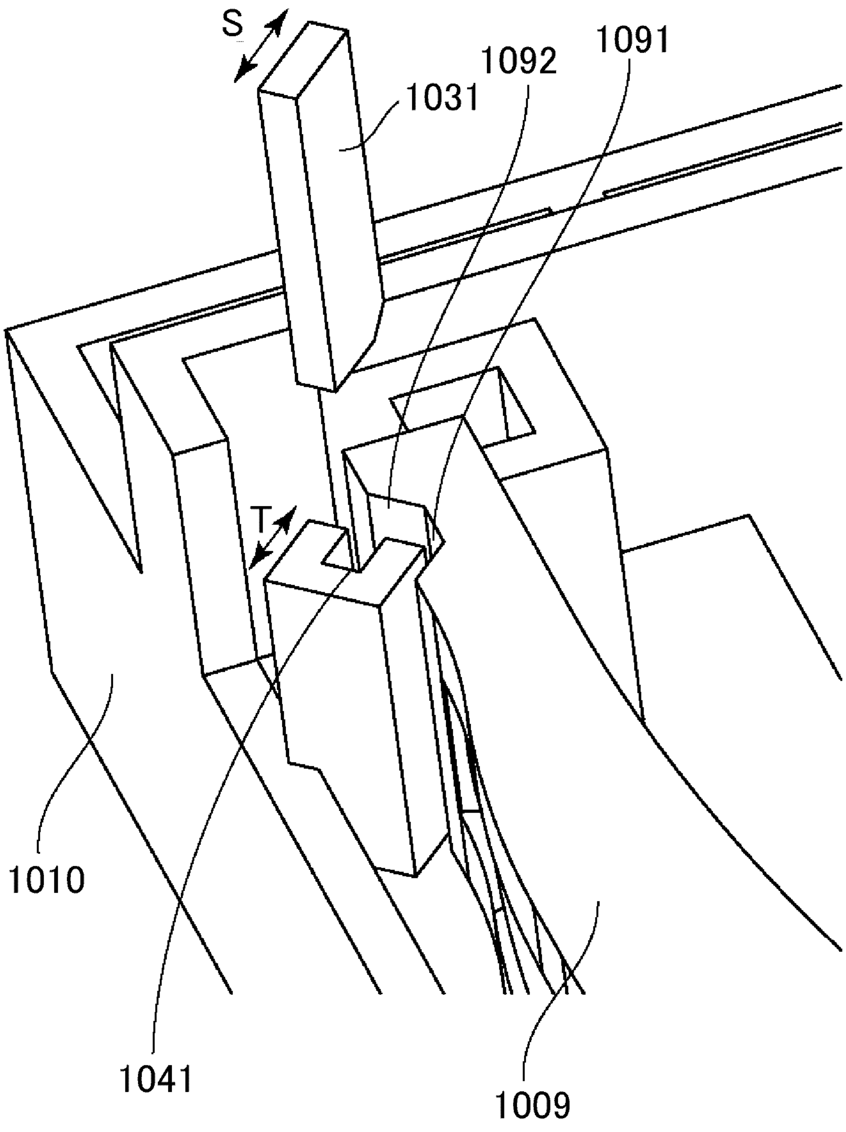
FIG. 14 is a perspective view illustrating relationship between the fθ lens and the fixing member in the positioning portion A.

FIG. 14 is a perspective view illustrating relationship between the fθ lens 1009 and a fixing member 1031 in the positioning portion A. The fixing member 1031 is an elastic member made of resin. In this example, the resin, which is PC (polycarbonate)+ABS and has flexural modulus of 2600 MPa, is used. FIG. 14 illustrates a state before the fixing member 1031 is mounted on the optical box 1010 for description. A shape of the fixing member 1031 is approximately rectangular. The fixing member 1031 is disposed between the pressed surface 1092 of the lens groove 1091 provided to the fθ lens 1009 and a groove 1041 provided to the optical box 1010. A length S of the fixing member 1031 in a direction perpendicular to the pressed surface 1092 is longer than a distance T between the pressed surface 1092 and the groove 1041.

The fixing member 1031 is press-fitted into a space constituted by the lens groove 1091 and the groove 1041, so that the fixing member 1031 cannot come off from the optical box 1010. A contacting portion of the fixing member 1031 with the fθ lens 1009 is only the pressed surface 1092, and since the length S of the fixing member 1031 is longer than the distance T, the fixing member 1031 can press the pressed surface 1092 in one direction.

Figure 15:
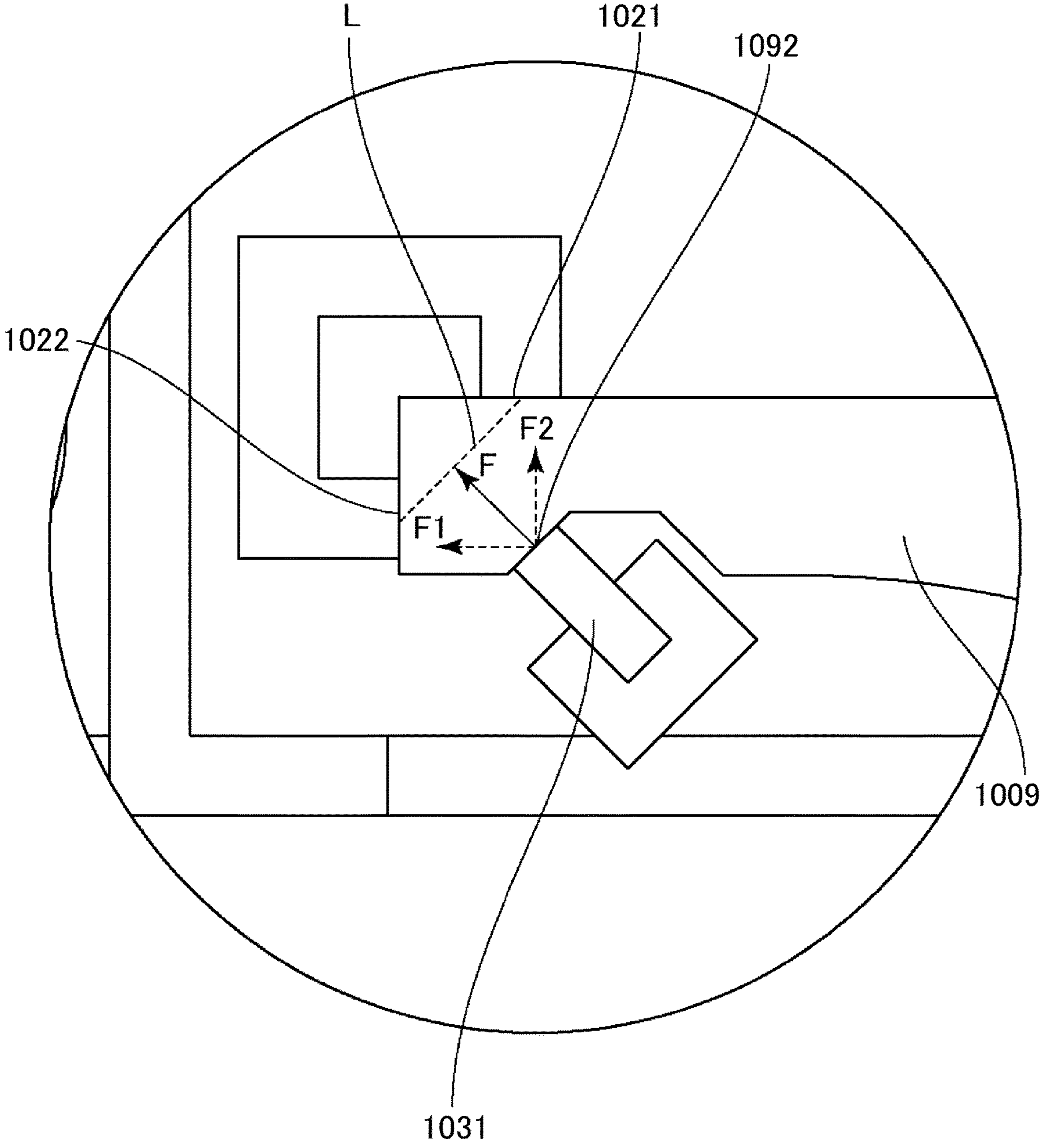
FIG. 15 is a view illustrating force generated between the fθ lens and the fixing member.

FIG. 15 is a view illustrating force generated to the fθ lens 1009 by the fixing member 1031. Pressing force F generated to the pressed surface 1092 of the fθ lens 1009 is generated perpendicular to the pressed surface 1092, and by the pressing force F, the fθ lens 1009 can obtain pressing force pressing against the positioning portion 1021 and the positioning portion 1022 of the optical box 1010. The pressing portion is set so that the pressing force occurs in a direction approximately perpendicular to a line segment L connecting the positioning portion 1021 and the positioning portion 1022. In the present Embodiment, the pressing force on the fθ lens 1009 goes through a midpoint of the line segment L and acts in a direction forming an angle of approximately 45° to the optical axis direction. The structure is such that only the pressed surface 1092 is pressed perpendicularly with the pressing force, and partial pressure thereof is applied to the positioning portion 1021 and the positioning portion 1022. By this structure, even if the pressing force acting on the pressed surface 1092 varies, ratio of pressing force F1 acting on the positioning portion 1021 to pressing force F2 acting on the positioning portion 1022 will be constant as long as positional relationship among the positioning portion 1021, the positioning portion 1022 and the pressed surface 1092 are determined. Thus, variation in the pressing force is reduced.

Figure 16:
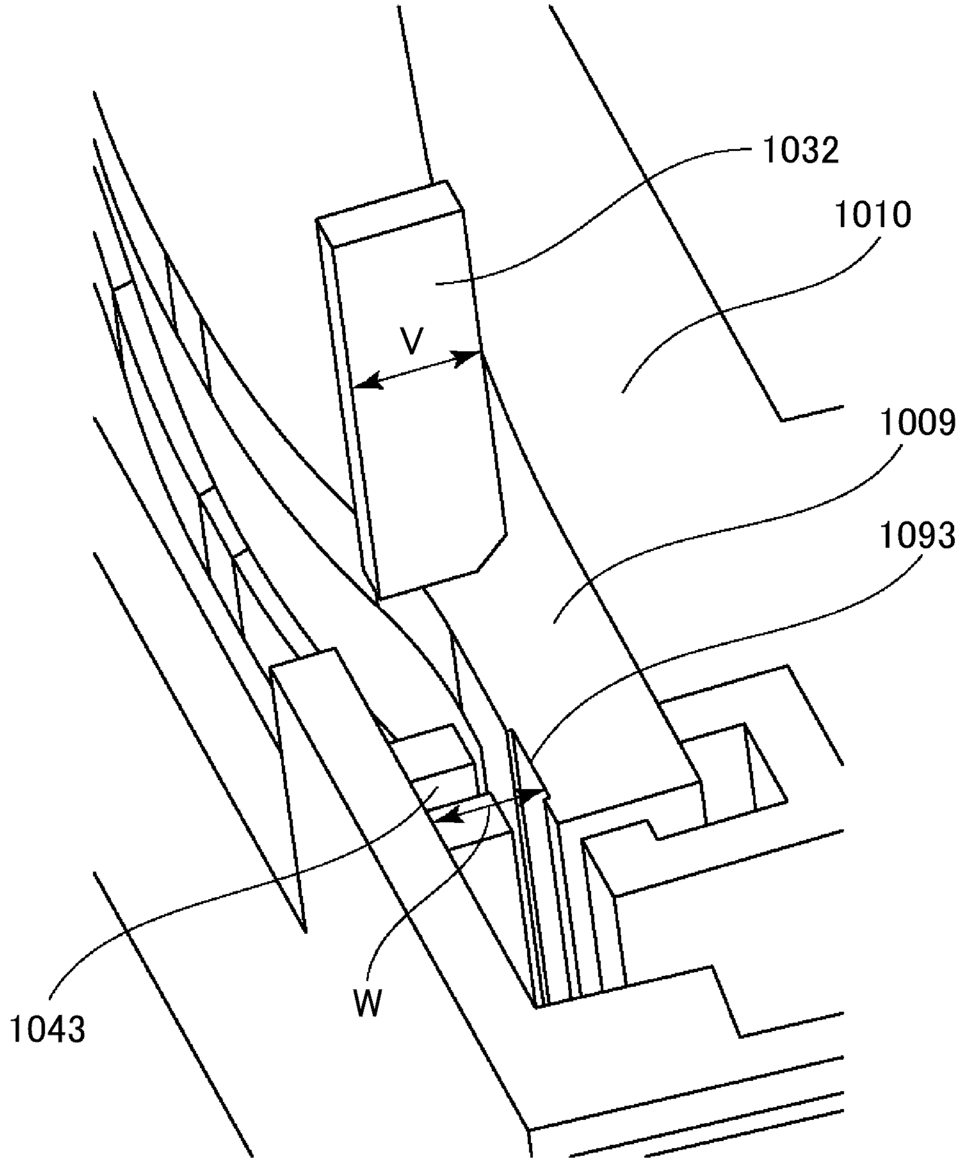
FIG. 16 is a perspective view illustrating relationship between the fθ lens and the fixing member in the positioning portion B.

FIG. 16 is a perspective view illustrating relationship between the fθ lens 1009 and a fixing member 1032 in the positioning portion B. For description, a state before the fixing member 1032 is press-fitted is illustrated.

Difference between the positioning portion B and the positioning portion A is that the fixing member 1032 presses the pressed surface 1093 of the fθ lens 1009 in the optical axis direction only. In the positioning portion B as well, a length V in a direction perpendicular to the pressed surface 1093 of the fixing member 1032 is longer than a distance W between the pressed surface 1093 and a groove 1043. The fixing member 1032 is press-fitted into a space constituted by the pressed surface 1093 and the groove 1043, so that the fixing member 1032 cannot come off from the optical box 1010.

As described above, the optical box 1010 is provided with a plurality of the positioning portions 1021 and 1022 for positioning the fθ lens 1009 in a plurality of directions perpendicular to each other. In this example, the plurality of the directions are the main scanning direction and the optical axis direction. And to the fθ lens 9, the pressed surface 1092 pressed by the fixing member 1031 is provided. It is configured that the normal direction of the pressed surface 1092 is different from any of the plurality of the directions, and when the fθ lens 1009 is pressed by the fixing member 1031, the position of the fθ lens 1009 in the plurality of the directions with respect to the optical box 1010 is determined. By this configuration, it is possible to obtain effect of improving the positioning accuracy of the scanning lens by reducing the variation in the pressing force which fixes the scanning lens.

Embodiment 4

Figure 17:
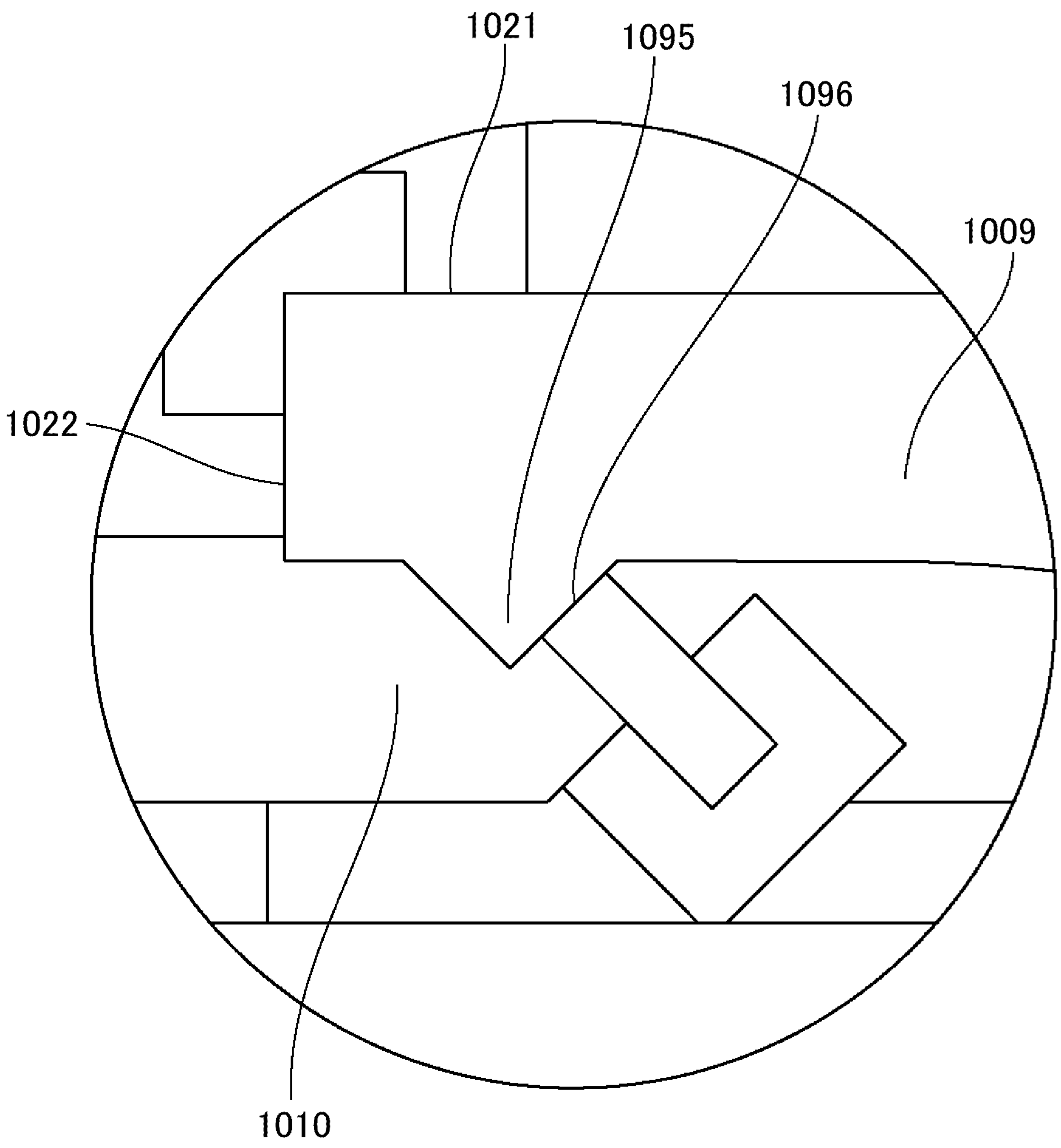
FIG. 17 is a top view illustrating the positional relationship between the fθ lens and the optical box according to an Embodiment 4.

Next, an optical scanning device according to an Embodiment 4 will be described. FIG. 17 is a view in which relationship between a shape of the end portion of the fθ lens 1009 and the fixing member 1031 in the positioning portion A of FIG. 11 is changed. Other configurations are the same as in the Embodiment 3.

Relationship between the optical box 1010 and the fθ lens 1009 will be described using FIG. 17. To the optical box 1010, the positioning portion 1021 and the positioning portion 1022, which position the fθ lens 1009 in the optical box 1010, are provided. As in the Embodiment 3, the positioning portion 1021 positions the fθ lens 1009 in the optical axis direction and the positioning portion 1022 positions the fθ lens 1009 in the main scanning direction.

In the Embodiment 3, the groove 1091 is provided at the end portion of the fθ lens 1009, however, in the present Embodiment, a projecting portion (projection) 1095 is provided at the end portion of the fθ lens 1009 and it is different in a point that a pressed surface 1096 is provided on the projecting portion 1095. A normal direction of the pressed surface 1096 is set to be different from the optical axis direction and the main scanning direction. In the present Embodiment, the normal direction has an angle of 45° relative to the optical axis direction and the main scanning direction, respectively. By making the end portion of the lens be the protruding shape in this manner, a thickness of the end portion of the lens can be thickened compared to the lens of the Embodiment 3, and as a result, it is possible to improve rigidity strength of the end portion of the lens.

Figure 18:
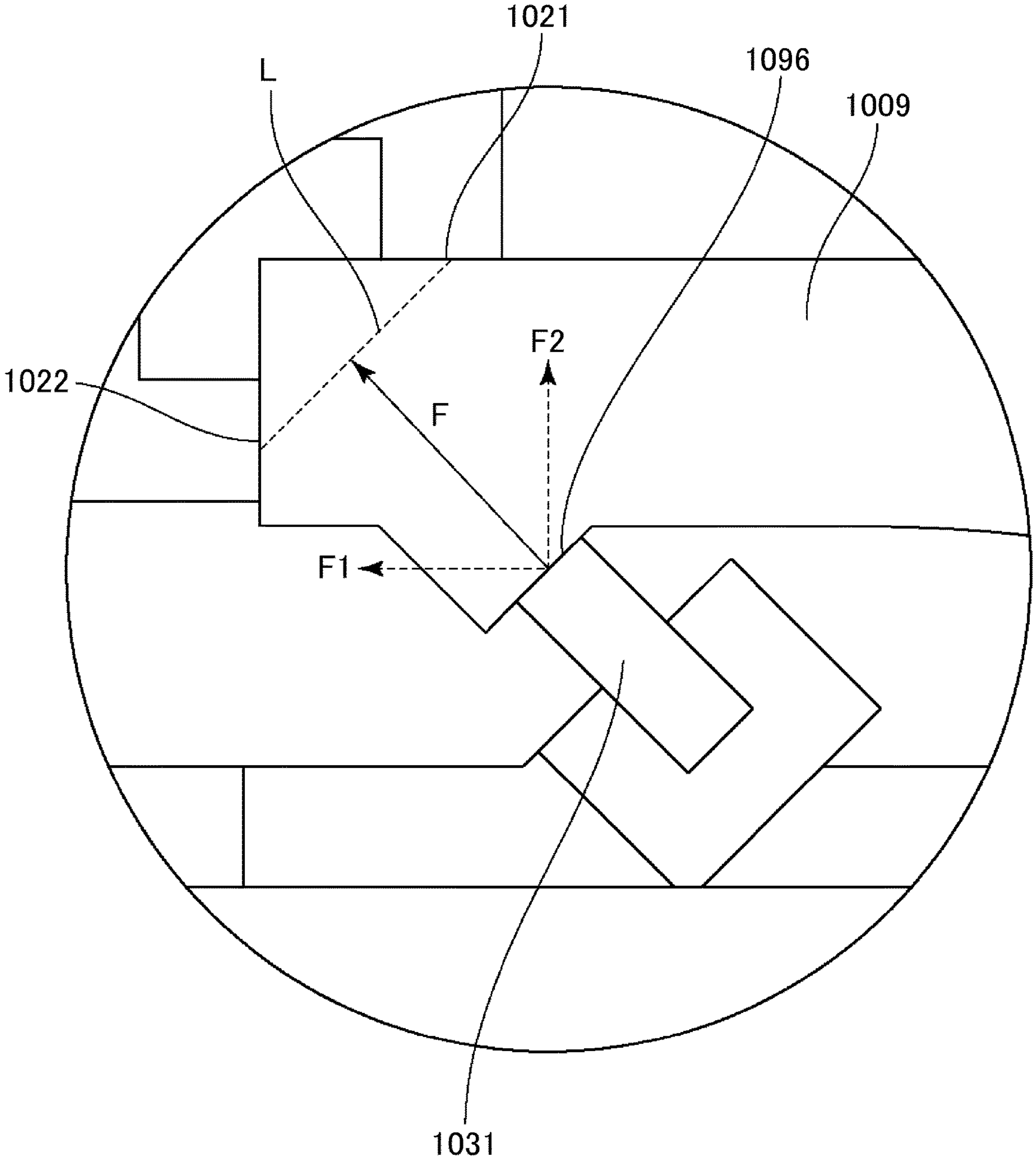
FIG. 18 is a view illustrating the force generated between the fθ lens and the fixing member according to the Embodiment 4.

FIG. 18 is a view illustrating force generated to the fθ lens 1009 by the fixing member 1031. Pressing force F generated to the pressed surface 1096 of the fθ lens 1009 is generated perpendicular to the pressed surface 1096. By this pressing force F, the pressing force pressing the fθ lens 1009 to the positioning portion 1021 and the positioning portion 1022 of the optical box 1010 can be obtained. The pressing force is set so as to be generated in a direction approximately perpendicular to the line segment L connecting the positioning portion 1021 and the positioning portion 1022. In the present Embodiment, the pressing force on the fθ lens 1009 goes through the midpoint of the line segment L and acts in the direction forming an angle of approximately 45° to the optical axis direction. The structure is such that only the pressed surface 1096 is pressed perpendicularly with the pressing force, and partial pressure thereof is applied to the positioning portion 1021 and the positioning portion 1022. By configuring this structure, even if the pressing force acting on the pressed surface 1096 varies, the ratio of the pressing force F1 acting on the positioning portion 1021 to the pressing force F2 acting on the positioning portion 1022 will be constant as long as positional relationship among the positioning portion 1021, the positioning portion 1022 and the pressed surface 1096 are determined.

By the configuration described above, it becomes possible to obtain effect of improving the positioning accuracy of the scanning lens by reducing the variation in the pressing force which fixes the scanning lens without reducing the strength of the end portion of the scanning lens.

Embodiment 5

Figure 19:
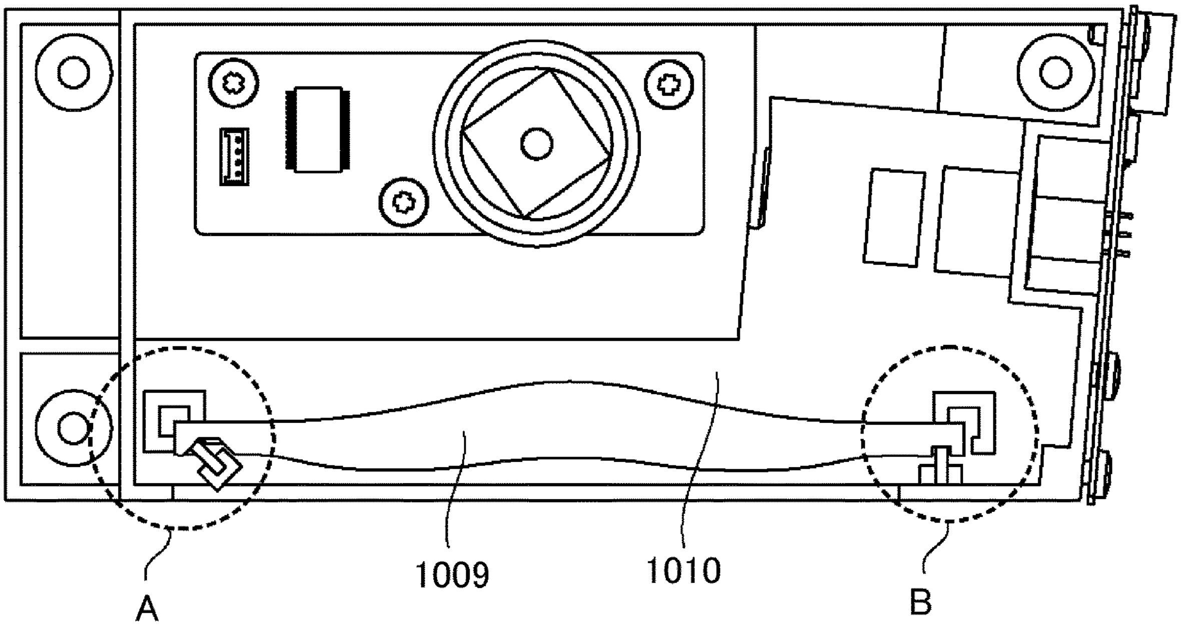
FIG. 19 is a top view illustrating the positional relationship between the fθ lens and the optical box according to an Embodiment 5.

Next, an optical scanning device according to an Embodiment 5 will be described. In FIG. 19, relationship between the fθ lens 1009, the fixing member 1031 and the fixing member 1032 in the positioning portion A, and the positioning portion B of FIG. 11 is changed. Other configurations are the same as in the Embodiment 3.

Figure 20:
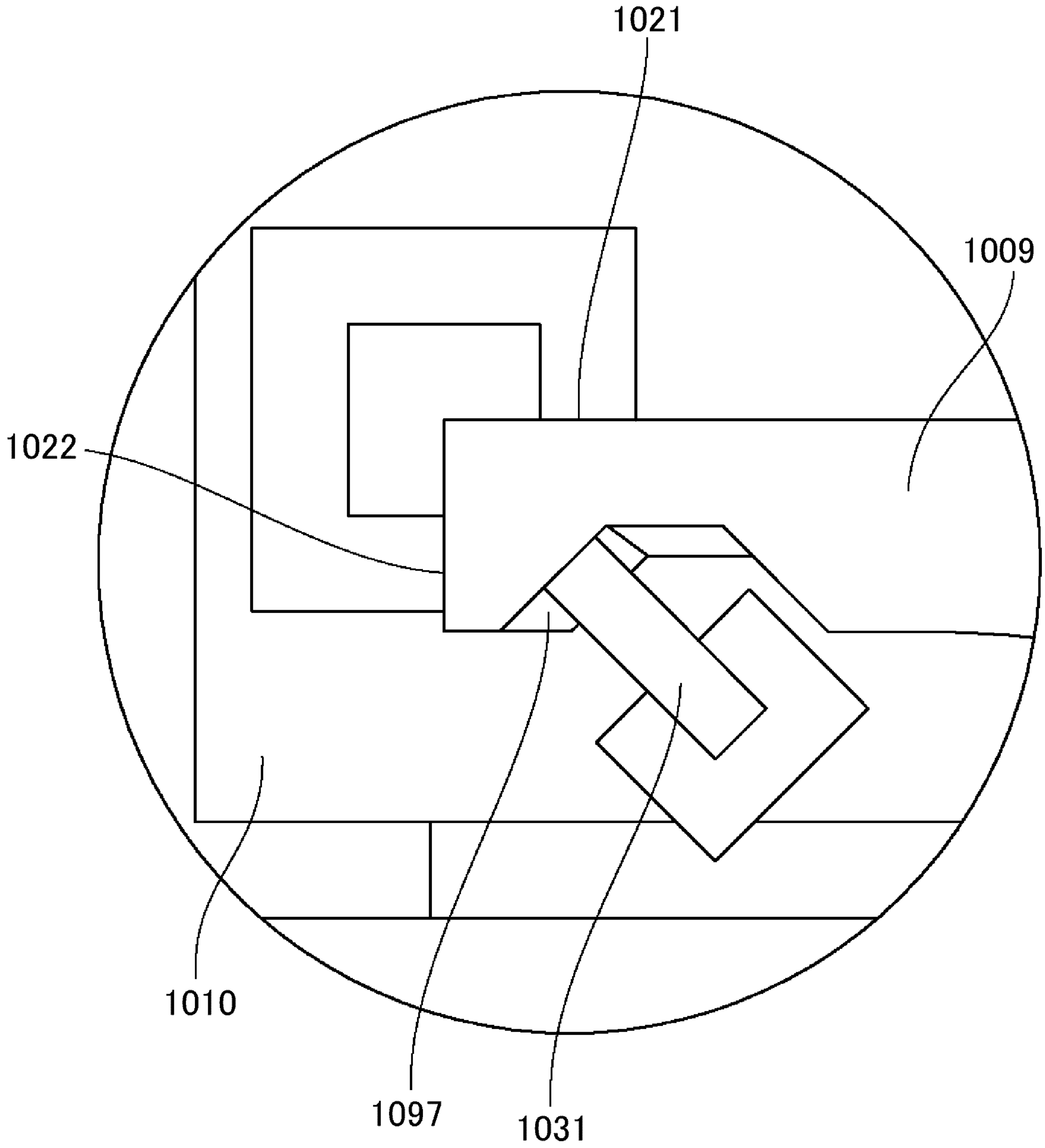
FIG. 20 is an enlarged view of the positioning portion A according to the Embodiment 5.
Figure 21:
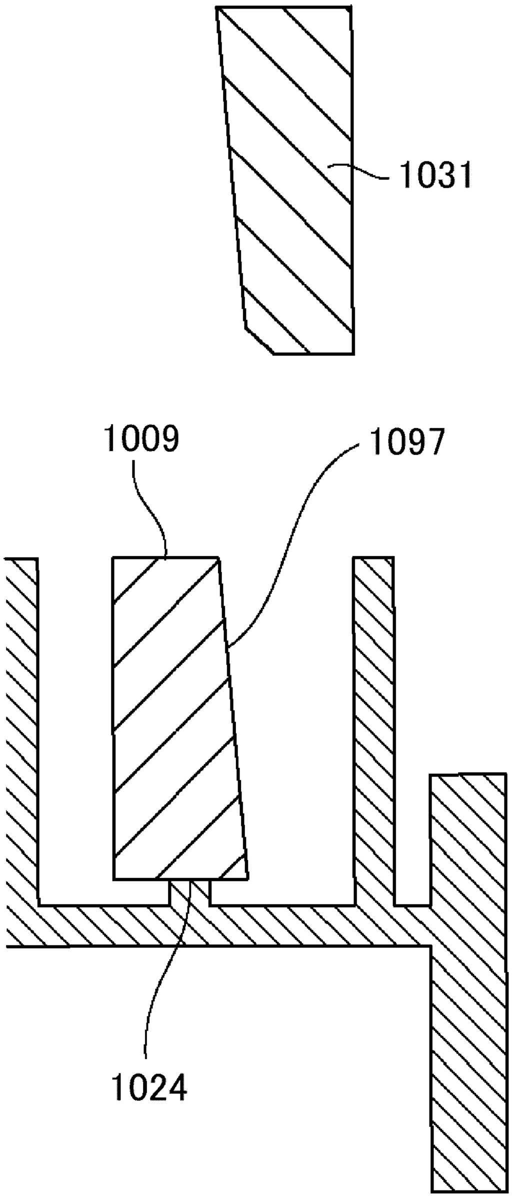
FIG. 21 is a cross-sectional view of the positioning portion A according to the Embodiment 5.

FIG. 20 is an enlarged view of the positioning portion A. FIG. 21 is a cross-sectional view of the positioning portion A. For description, a state before the fixing member 1031 is mounted on the optical box 1010 is illustrated.

As shown in FIG. 20, to the optical box 1010, the positioning portion 1021 and the positioning portion 1022 which position the fθ lens 1009 in the optical box 1010 are provided. As in the Embodiment 3, the positioning portion 1021 positions the fθ lens 1009 in the optical axis direction and the positioning portion 1022 positions the fθ lens 1009 in the main scanning direction. By mounting the fixing member 1031 on this positioning portion, the fθ lens 1009 is fixed with respect to the optical axis direction and the main scanning direction. Furthermore, as shown in FIG. 21, to the optical box 1010, a positioning portion 1024 is provided to position the fθ lens 1009 in the sub scanning direction.

While the shape of the fixing member 1031 used in the Embodiment 3 and the Embodiment 4 is approximately rectangular in a cross section thereof, the shape of the fixing member 1031 used in the Embodiment 5 is approximately trapezoidal in a cross section thereof.

A reason why a part of the trapezoidal shape is notched is to facilitate insertion of the fixing member 1031 upon mounting. In addition, a shape of a pressed surface 1097 is different as well. A normal direction of the pressed surface 1097 is set so as to be different from any of the optical axis direction, the main scanning direction and the sub scanning direction. The pressed surface 1097 is provided in a direction so that, when the pressed surface 1097 is pressed by the fixing member 1031, the fθ lens 1009 is pressed to the positioning portion 1021, the positioning portion 1022 and the positioning portion 1024 provided in the optical box.

The pressed surface 1097 is provided facing in a direction so that the fθ lens 1009 is pressed to the positioning portion 1021, the positioning portion 1022 and the positioning portion 1024 provided in the optical box. By employing the configuration of the present Embodiment, it becomes possible to improve ability of fixing the lens against impact in an event of a drop, etc., since the positioning of the lens in the sub scanning direction is performed by being pressed actively rather than relying on frictional force between the lens and the fixing member.

Figure 22:
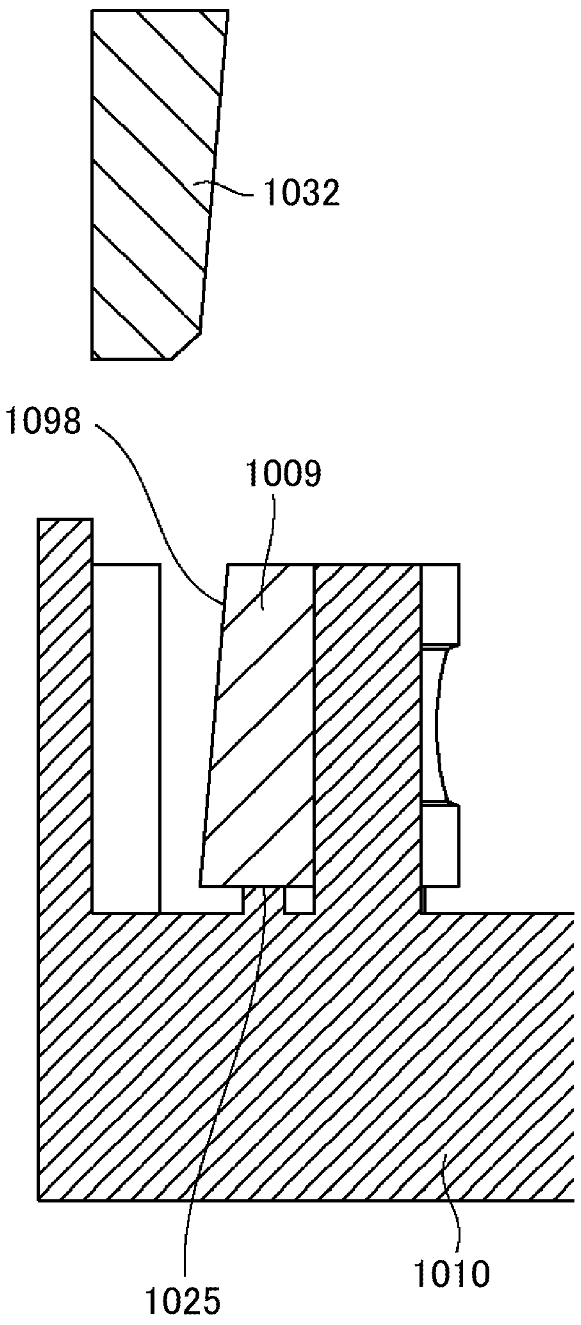
FIG. 22 is a cross-sectional view of the positioning portion B according to the Embodiment 5.

FIG. 22 is a cross-sectional view of the positioning portion B. For description, a state before the fixing member 1032 is mounted on the optical box 1010 is illustrated.

While the shape of the fixing member 1032 used in the Embodiments 3 and 4 is approximately rectangular in cross section thereof, the shape of the fixing member 1032 used in the Embodiment 5 is approximately trapezoidal in cross section thereof. A reason why a part of the trapezoidal shape is notched is to facilitate insertion of the fixing member 1032 upon mounting. In addition, a shape of a pressed surface 1098 is different. A normal direction of the pressed surface 1098 is set so as to be different from both the optical axis direction and the sub scanning direction. In the present Embodiment, the pressed surface 1098 is provided in a direction so that, when the pressed surface 1098 is pressed by the fixing member 1032, the fθ lens 1009 is pressed to the positioning portion 1023 and a positioning portion 1025 provided in the optical box.

By the configuration described above, the positioning of the lens in the sub scanning direction is performed by being pressed actively rather than relying on frictional force between the lens and the fixing member. By this, it becomes possible to obtain effect of improving the positioning accuracy of the scanning lens by reducing the variation in the pressing force which fixes the scanning lens while improving the ability of fixing the lens against the impact in the event of the drop, etc.

Incidentally, in the Embodiments 3 through 5 described above, an object to be fixed by the fixing member is the scanning lens, however, a mirror as an optical element, which reflects the laser light beam, may be fixed to the casing in the same manner as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2023-062557 filed on Apr. 7, 2023 and 2023-103509 filed on Jun. 23, 2023, which are hereby incorporated by reference herein in its entirety.

What is claimed is:

1. An optical scanning device comprising:
- a light source;
- a deflector configured to deflect and scan a light beam emitted from the light source;
- an optical element configured to guide the light beam scanned by the deflector to a scanned member;
- a casing including a bottom surface on which the deflector and the optical element are mounted, and a side wall which stands from the bottom surface and on which the light source is mounted; and
- a fixing member configured to position the optical element to the casing and to fix an end portion of the optical element in a longitudinal direction of the optical element,
- wherein the casing, the optical element and the fixing member are made of resin,
- wherein the optical element includes an incident surface permitting incidence of the light beam deflected and scanned by the deflector, an emergent surface permitting emission of the light beam incident from the incident surface, a first crossing surface contacting the bottom surface in a state in which the optical element is fixed by the fixing member and crossing the incident surface and the emergent surface, and a second crossing surface crossing the incident surface and the emergent surface and opposite to the first crossing surface,
- wherein in a state in which the optical element is fixed to the casing by the fixing member, the casing includes a first contacting surface contacting the incident surface in the end portion of the optical element in the longitudinal direction, a side surface of an outside of the casing in the side wall, and a second contacting surface of an inside of the casing in the side wall,
- wherein the side surface includes a projecting portion projecting toward the outside of the casing, and
- wherein in a state in which the optical element is fixed to the casing, the fixing member includes a first portion including an engaged portion engaged with the projecting portion and extending in a direction toward the bottom surface, a second portion including a first surface contacting the second contacting surface and a second surface contacting the emergent surface and extending toward the bottom surface, and a third portion including a third surface contacting the second crossing surface and extending toward the bottom surface.

2. An optical scanning device according to claim 1, wherein when the projecting portion is a first projecting portion and the engaged portion is a first engaged portion, respectively, the casing includes a second projecting portion projecting toward an opposite side of the first contacting surface, and
- wherein the fixing member includes a second engaged portion engaged with the second projecting portion.

3. An optical scanning device according to claim 1, wherein the projecting portion is provided on a side wall parallel to the longitudinal direction, and
- wherein the first portion is provided parallel to the second portion.

4. An optical scanning device according to claim 1, wherein the projecting portion is provided on a side wall perpendicular to the longitudinal direction, and
- wherein the first portion is provided perpendicular to the second portion.

5. An image forming apparatus comprising:

a photosensitive member;

an optical scanning device according to claim 1, the optical scanning device scanning the photosensitive member with a light beam according to image information;

a developing portion configured to develop a latent image formed on the photosensitive member with toner; and a transfer portion configured to transfer a toner image formed on the photosensitive member onto a recording material.

* * * * *